(12) United States Patent
McNally et al.

(10) Patent No.: US 6,254,371 B1
(45) Date of Patent: Jul. 3, 2001

(54) PRESS SYSTEM FOR URETHANE PARTS

(75) Inventors: Douglas J. McNally; Keith Wallace, both of Ontario (CA)

(73) Assignee: Konal Engineering and Equipment Inc., Blenheim (CA)

( * ) Notice: Subject to any disclaimer, the term of this patent is extended or adjusted under 35 U.S.C. 154(b) by 0 days.

(21) Appl. No.: 09/041,068

(22) Filed: Mar. 12, 1998

Related U.S. Application Data

(63) Continuation-in-part of application No. 08/915,621, filed on Aug. 21, 1997, now abandoned.

(51) Int. Cl.$^7$ .............................. B29C 33/20; B29C 44/34
(52) U.S. Cl. .................. 425/214; 425/451.2; 425/451.7; 425/590
(58) Field of Search .................................. 425/451, 451.2, 425/451.9, 450.1, 453, 451.7, 590, 409, 589, 214

(56) References Cited

U.S. PATENT DOCUMENTS

| | | | |
|---|---|---|---|
| 3,262,158 | * | 7/1966 | Reimer et al. . |
| 4,008,026 | * | 2/1977 | Engstrom . |
| 4,828,475 | * | 5/1989 | Kamiguchi ............................ 425/150 |
| 4,828,476 | * | 5/1989 | Yoshiharu et al. .................... 425/150 |
| 4,944,669 | | 7/1990 | Zakich ................................. 425/589 |
| 5,044,919 | * | 9/1991 | Hama et al. .......................... 425/443 |
| 5,091,124 | | 2/1992 | Zakich ................................. 264/40.1 |
| 5,261,810 | | 11/1993 | Kamp et al. ......................... 425/451.9 |
| 5,282,732 | | 2/1994 | Eggert ................................... 425/153 |
| 5,458,843 | * | 10/1995 | Brown et al. ....................... 264/297.2 |
| 5,562,400 | * | 10/1996 | Travis ................................. 414/745.3 |
| 5,741,528 | | 4/1998 | Amano et al. .......................... 425/29 |
| 5,811,139 | | 9/1998 | Hehl ..................................... 425/590 |
| 5,879,726 | * | 3/1999 | Hsing ................................. 425/451.2 |

FOREIGN PATENT DOCUMENTS

| | | |
|---|---|---|
| 1 310 796 | 12/1992 | (CA) . |
| 0 245 517A1 | 11/1987 | (EP) . |
| 0 271 588A1 | 6/1988 | (EP) . |
| 0 285 046A2 | 10/1988 | (EP) . |
| 0 585 120A1 | 3/1994 | (EP) . |
| 0 589 050A1 | 3/1994 | (EP) . |

* cited by examiner

*Primary Examiner*—James P. Mackey
*Assistant Examiner*—Emmanuel Luk
(74) *Attorney, Agent, or Firm*—Flynn, Thiel, Boutell & Tanis, P.C.

(57) ABSTRACT

The mold press includes a drive arrangement for controlling press movement and closure force. The drive arrangement includes a pair of generally identical drive units connected between upper and lower press plates adjacent opposite longitudinal ends of the press. The drive units in a preferred embodiment each employ a ball-screw drive arrangement. The screw shaft extends vertically between the top and bottom press plates. The screw shaft engages a ball nut mounted on one press plate, typically the bottom press plate which is disposed for movement toward and away from the top press plate. A first high speed drive arrangement employing a first electric motor is coupled to the screw shafts for effecting high speed opening and closing of the bottom press plate. A second low-speed driving arrangement including a second electric motor is drivingly connected to the ball-nut assemblies for permitting low-speed but high-torque driving of the nut units for final closing of the press and application of the desired press force. Each drive unit has the screw shaft resiliently supported for limited axial displacement relative to the upper press plate so that, when the second drive system is activated to effect final closure of the mold, one or the other of the screw shafts can be axially displaced a small amount if necessary so as to permit full closure between the opposed upper and lower mold parts even though irregularities may cause one longitudinal end of the mold parts to contact and close prior to the other longitudinal end.

11 Claims, 16 Drawing Sheets

PRESS SYSTEM FOR URETHANE PARTS

CROSS REFERENCE TO RELATED APPLICATION

This application is a continuation-in-part of application Ser. No. 08/915,621 filed on Aug. 21, 1997, now abandoned and entitled "PRESS SYSTEM FOR URETHANE PARTS".

FIELD OF THE INVENTION

This invention relates to a press system for forming plastic parts, such as urethane parts, and more particularly to an improved press which is preferably defined on a self-propelled carrier associated with and suspended from an overhead transport system and which includes an improved drive arrangement for effecting closure of the press.

BACKGROUND OF THE INVENTION

It is conventional to form components which are partially or totally of plastic, particularly large components such as vehicle door panels and the like, in a reaction injection mold press (commonly referred to as a "rim" press) with the part being formed in a mold cavity defined between relatively movable upper and lower mold parts. For forming a component such as a vehicle door panel, various techniques can be utilized. For example, a vinyl sheet which can be heated and vacuumed formed, and possibly in conjunction with a fiberglass sheet, can be positioned in the mold cavity and polyurethane deposited into the cavity to permit molding of the desired component within the press. In some circumstances the vinyl is premolded or preshaped, or in other circumstances the molded component is formed without a vinyl layer.

The conventional mold presses for forming such components are often mounted on a turntable which indexes through a plurality of stations formed along a circular work path. While this arrangement does provide convenience with respect to efficient movement of multiple presses into and through spaced workstations, nevertheless such turntable arrangement typically permits access to the press and specifically to the upper and lower mold parts only from one side, and this greatly hinders and restricts the desired access to the press since workers must access the press so as to not only insert whatever premold parts and components are necessary, but also to assist in removal of the molded part.

As an alternative, many of the known mold presses are freestanding units. This increases worker access by typically permitting access to the press at least from opposite sides thereof. Nevertheless, the overall molding process associated with a single press involves several stages and hence requires significant time, and thus efficient use of workers accordingly normally requires that the workers move back and forth so as to permit servicing of several adjacent freestanding presses. Such arrangement is less efficient than desired, and more fatiguing for workers.

With the known mold presses, as briefly discussed above, the opening and closing movement of the press, as well as the press closure force, is typically controlled by fluid pressure cylinders, normally hydraulic cylinders. Such press arrangements, however, are generally energy inefficient since the use of hydraulic cylinders as the energizing source, and the overall support equipment necessary to provide and supply pressurized hydraulic fluid to the press cylinders, results in significant energy loss in relationship to the electrical energy which is supplied so as to effect operation of the press fluid system. In addition, presses employing hydraulic cylinders for creating the moving and pressing function of the press have also demonstrated an undesirable noise level associated with the fluid cylinder system. Such systems also typically experience leakage of hydraulic fluid, which can create an undesired and sometimes potentially hazardous condition around the press. The hydraulic systems also generate significant and often undesired heat.

Accordingly, it is an object of this invention to provide an improved mold press which is believed to overcome many of the disadvantages and inconveniences associated with known mold presses, as briefly summarized above, and which is believed to provide for improved efficiency of operation, improved energy efficiency, and improved convenience of access and use.

More specifically, the improved mold press of this invention includes a drive arrangement for controlling the press movement and closure force which is totally electric so as to eliminate the use of hydraulic cylinders and the like, whereby the overall energy efficiency of the press is significantly improved, and at the same time, heat generation and oil leakage problems associated with conventional hydraulic cylinder presses are eliminated. The improved mold press and specifically the drive arrangement includes a pair of generally identical drive units which are associated with and connected between the upper and lower press plates adjacent opposite longitudinal ends of the press. The drive units in a preferred embodiment each employ a screw-nut drive arrangement, preferably a ball-screw arrangement. The screw shaft is an elongate member which extends vertically between the top and bottom press plates, with the screw shaft engaging a ball nut assembly which is mounted on one of the press plates, typically the bottom press plate which is disposed for movement toward and away from the top press plate. A first high speed drive arrangement employing a first electric motor is coupled to the screw shafts for effecting high speed rotation and hence effecting high speed opening and closing movement of the bottom press plate. A second low-speed driving arrangement including a second electric motor is drivingly connected to the ball-nut assemblies of the two drive units for permitting a low-speed but high-torque driving of the nut units for final closing of the press and application of the desired press force. Each drive unit preferably has the screw shaft resiliently supported for limited axial displacement relative to the upper press plate so that, when the second drive system is activated to effect final closure of the mold one or the other of the screw shafts can be axially displaced a small amount if necessary so as to permit full closure between the opposed upper and lower mold parts even though irregularities may cause one longitudinal end of the mold parts to contact and close prior to the other longitudinal end.

In the improved mold press of this invention, as aforesaid, the first and second drive systems are typically separately actuated in that only the first drive system is activated so as to permit high speed movement of the lower press plate during closure of the lower mold part toward the upper mold part until substantially reaching the closed position. At such time the first drive system is deactivated, and preferably a locking device is actuated which then engages and holds the screw shaft nonrotatable. The second drive system is then activated to effect rotation of the ball nut assemblies associated with the lower press plate to effect final closure of the mold and imposition of the desired mold pressure between the upper and lower mold parts. During activation of the second drive system, if one end of the mold parts contact and close prior to the other end, then the nut assembly associated with said one end continues to drive, and the associated screw shaft is axially displaced in opposition to the resilient structure associated therewith until the drive unit associated with the other end of the mold parts senses proper closure, at which time the second drive system is de-energized. The screw mechanisms associated with the drive units then effectively maintain the mold parts in a closed or locked position whereby imposition of further driving force is not required, even though the mold parts remain in their closed and effectively locked position.

In accordance with the present invention, as aforesaid, the mold press is preferably mounted on a self-propelled overhead carrier associated with and driven along an overhead rail system so that the mold press is suspended from the carrier and free of direct support from the underlying floor. The overall system preferably includes a plurality of carriers each mounting thereon a mold press, with the carriers being sequentially moved through a plurality of spaced stations along the overhead track, the latter preferably defining a loop, to facilitate efficient use of the presses by permitting various functions to be carried out at spaced workstations, with the presses being efficiently transferred between workstations, and with the actual molding operation being carried out either as the carrier is transferred between workstations or is shuttled into an intermediate holding zone for sufficient duration to permit the desired molding of the component. With the mold press mounted on a driven overhead carrier, the press provides greatly increased access to the mold parts by workers, and for example both the upper and lower mold parts can be mounted on respective upper and lower press plates which vertically swing into more convenient access positions, with the upper mold part swinging into a position accessible from one side of the press, and the lower mold part swinging into a position accessible from the opposite side of the press, whereby two workers located on opposite sides of the press can readily and simultaneously access the respective upper and lower mold parts to facilitate preparation of the mold. Other access positions or arrangements can also be provided.

In addition, the improved mold press of this invention includes a electric drive arrangement for controlling the opening and closing movement between upper and lower press plates. The drive arrangement includes a pair of generally parallel ball-screw drive units which extend vertically and cooperate with the movable press plate for controlling opening and closing movement thereof. The press is mounted on a self-propelled overhead carrier associated with and driven along an overhead rail system so that the press can be sequentially moved between the plurality of working stations. The ball-screw drive units are driven from an electric motor which is mounted on and moves with the carrier, with electrical power being supplied to the carrier in a conventional fashion from an electrical supply track which extends along the overhead rail system.

Other objects and purposes of the invention will be apparent to persons familiar with assemblies of this general type upon reading the following specification and inspecting the accompanying drawings.

Figure 1:
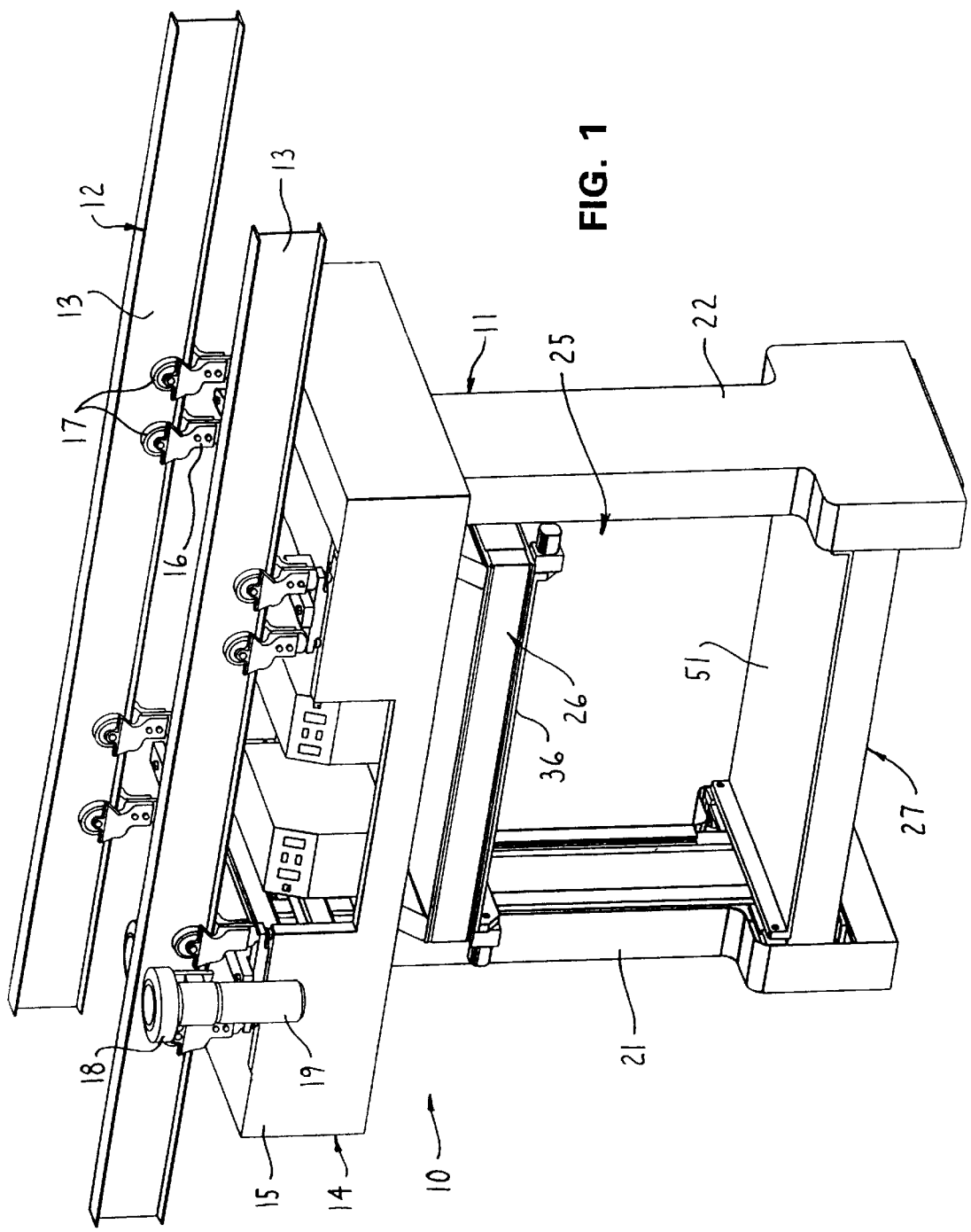
FIG. 1 is a perspective view taken from one side of an overhead press arrangement according to the present invention, which arrangement illustrates the lower platen in an open position.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the press unit and designated parts thereof. Said terminology will include the words specifically mentioned, derivatives thereof, and words of similar import.

DETAILED DESCRIPTION

Figure 2:
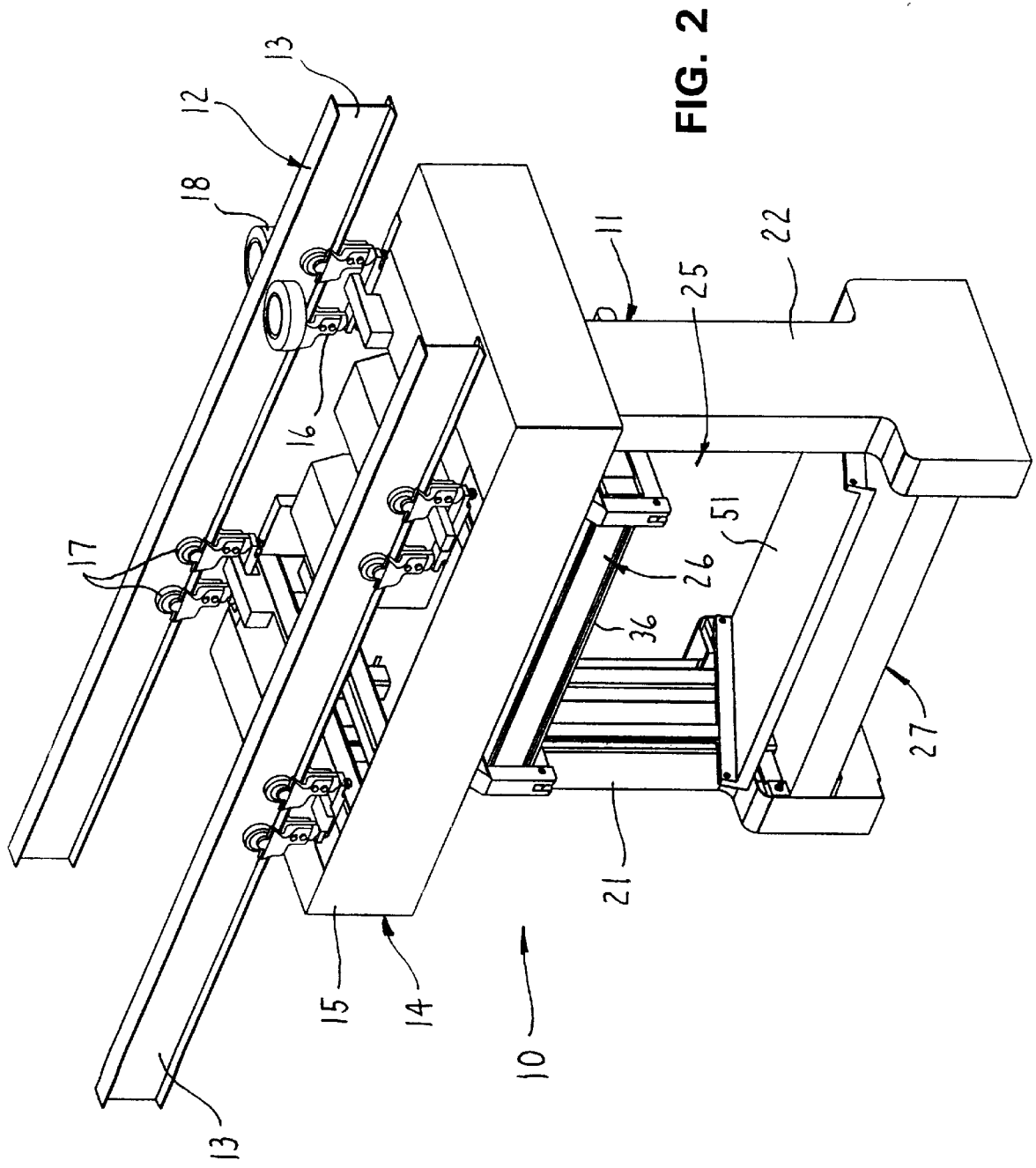
FIG. 2 is a perspective view similar to FIG. 1 but taken from the opposite side of the press arrangement, and illustrating the booking plate of the lower platen in an upwardly tilted access position.
Figure 3:
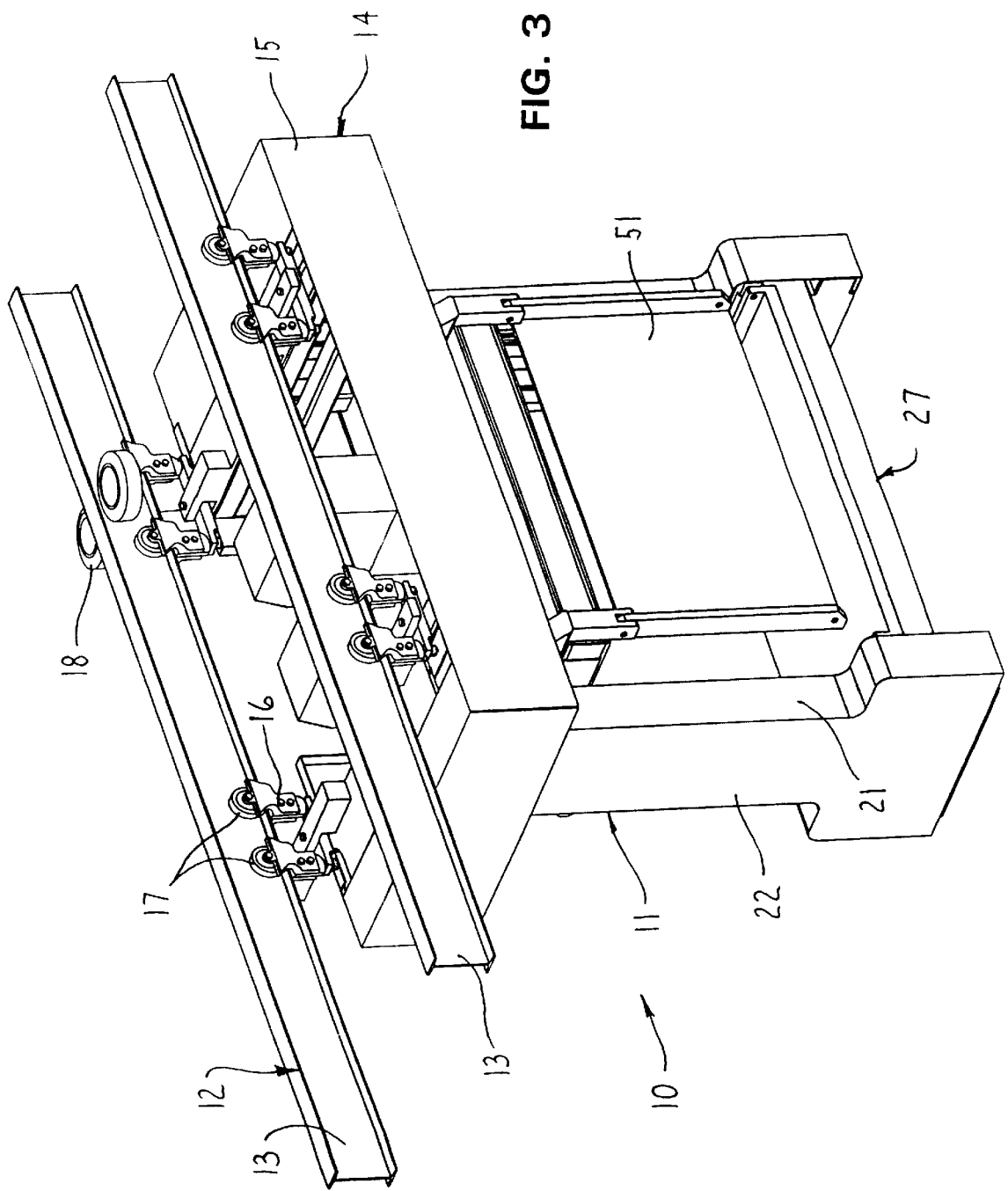
FIG. 3 is a further perspective view which shows the same side of the press unit as FIG. 2, and which illustrates the booking plate of the upper platen in a downwardly tilted access position.

Referring to the drawings and specifically FIGS. 1–3, there is illustrated a molding system 10 according to the present invention. The molding system 10 includes a plurality of self-propelled carriers, only one carrier 11 being illustrated in FIGS. 1–3, supported in suspended relation from an overhead rail system 12. The rail system 12 is typically positioned in upwardly spaced relation from the floor, such as adjacent a ceiling, and in the illustrated embodiment includes a pair of generally parallel and horizontally extending rails or beams 13 from which individual carriers 11 are suspended. The rails 13 are typically formed to define a closed loop so that the carriers can be moved along a closed path into a plurality of workstations defined along the path.

The carrier 11 includes a generally rigid frame 14 which defines a top frame structure 15 disposed downwardly below and extending transversely between the pair of overhead rails 13. The top frame structure 15 mounts thereon a plurality of upwardly projecting cradles or yokes 16, with at least two said yokes preferably being disposed adjacent each side of the frame adjacent front and trailing ends thereof. Each cradle 16 in turn mounts thereon a plurality of rollers 17 which effectively rollingly engage the upper surface of the bottom flange of the respectively adjacent support rail 13. The support rail 13 in the illustrated and preferred embodiment is formed generally as an I-shaped beam so that the rollers 17 effectively straddle the I-beam and rollingly engage the lower flange thereof on opposite sides of the vertical web of the I-beam.

The top frame structure 15 also supports thereon at least one drive arrangement for the carrier, and in the illustrated embodiment a pair of drive rollers 18 are rotatably supported adjacent one side of the carrier and are disposed on opposite sides of one of the I-beam rails 13 so as to maintain the web of the I-beam engaged therebetween. A suitable electrical drive motor 19 is interconnected to one or both of the drive rollers 18 to effect driving engagement with the support rail 13 when movement of the carrier 11 along the overhead rails is desired. While only one driving roller arrangement is illustrated in the drawings, it will be appreciated that additional driving roller arrangements can be provided if necessary or desired.

The suspension of a carrier 11 from an overhead rail arrangement, and the driving movement of the carrier along the overhead rails by means of a motorized drive roller arrangement mounted on the carrier, is conventional and further detailed description thereof is believed unnecessary.

The frame 14 of the carrier 11 includes a pair of end frames 21 and 22 which are disposed adjacent opposite longitudinal ends of the carrier, with the end frames 21 and 22 being rigidly fixed to the top frame structure adjacent opposite ends thereof. The end frames 21 and 22 project vertically downwardly from the top frame in generally parallel relationship, and are cantilevered downwardly so as to define a large open region therebetween which not only extends vertically between the end frames, but also transversely of the carrier (i.e., horizontally sidewardly through the carrier relative to the longitudinal direction of movement of the carrier). The end frames 21 and 22 are substantially identical and each includes a pair of vertically elongate and substantially parallel support posts 23 which are disposed in sidewardly spaced relation. The upper ends of the posts 23 as associated with each side frame are rigidly joined to the top frame structure, and the lower ends of the posts 23 as associated with each end frame are rigidly joined by a cross rail 24 which extends transversely therebetween.

The frame 14 supports thereon a press 25 (i.e., a rim press) for forming parts which are at least partially molded of a plastics material such as polyurethane. The parts are typically rather large in size and may comprise parts such as interior door panels for vehicles and the like. The press 25 as provided on the carrier 11 includes an upper press structure 26 which in the preferred embodiment is fixedly related to the top frame structure 15, and a lower press structure 27 which is vertically movably supported on and between the end frames 21 and 22. The bottom press structure 27 is vertically slidably guided on guides or gibs 28 which are fixed to and project vertically along the frame posts 23.

The press 25 is adapted to support thereon a mold which typically includes a top mold part 31 which is fixedly supported on and projects downwardly from the upper press structure 26, and a bottom mold part 32 which is fixedly supported on and projects upwardly from the bottom press structure 27. The top and bottom mold parts 31 and 32 are hence disposed generally in vertically aligned relation, and they respectively define therein opposed mold cavity portions which cooperate to define a mold cavity for forming the desired part when the bottom mold part has been moved up into a closed engaged relation with the upper mold part. The construction of the mold parts 31 and 32 is conventional, is designed in accordance with the specific part being formed, and further detailed description thereof is believed unnecessary.

The top press structure 26 preferably includes a top press plate 36 which defines thereon, in the normal operating position of the press, a generally horizontally enlarged and downwardly facing surface to which the upper mold part 31 is fixedly secured. This top press plate 36, which is often referred to as a booking plate, is secured along one longitudinally extending side edge thereof to the stationary upper press structure 26 by a hinge structure 37 which defines a generally horizontally extending hinge axis 38, the latter extending generally in the longitudinal direction of the carrier and being disposed adjacent one side thereof. This hinge structure 37 permits the top booking plate 36 and the top mold part 31 mounted thereon to be vertically swung downwardly about the axis 38 through an angle approaching 90° so that the top booking plate is thus suspended generally vertically downwardly between the end frames 21 and 22 adjacent one side of the carrier, substantially as indicated by dotted lines in FIG. 6. When in this downwardly suspended position, the upper mold part 31 is positioned so that the mold cavity thereof can be readily accessed by a worker standing adjacent one side of the press to permit performance of the necessary manual operations required relative to the upper mold part.

Figure 5:
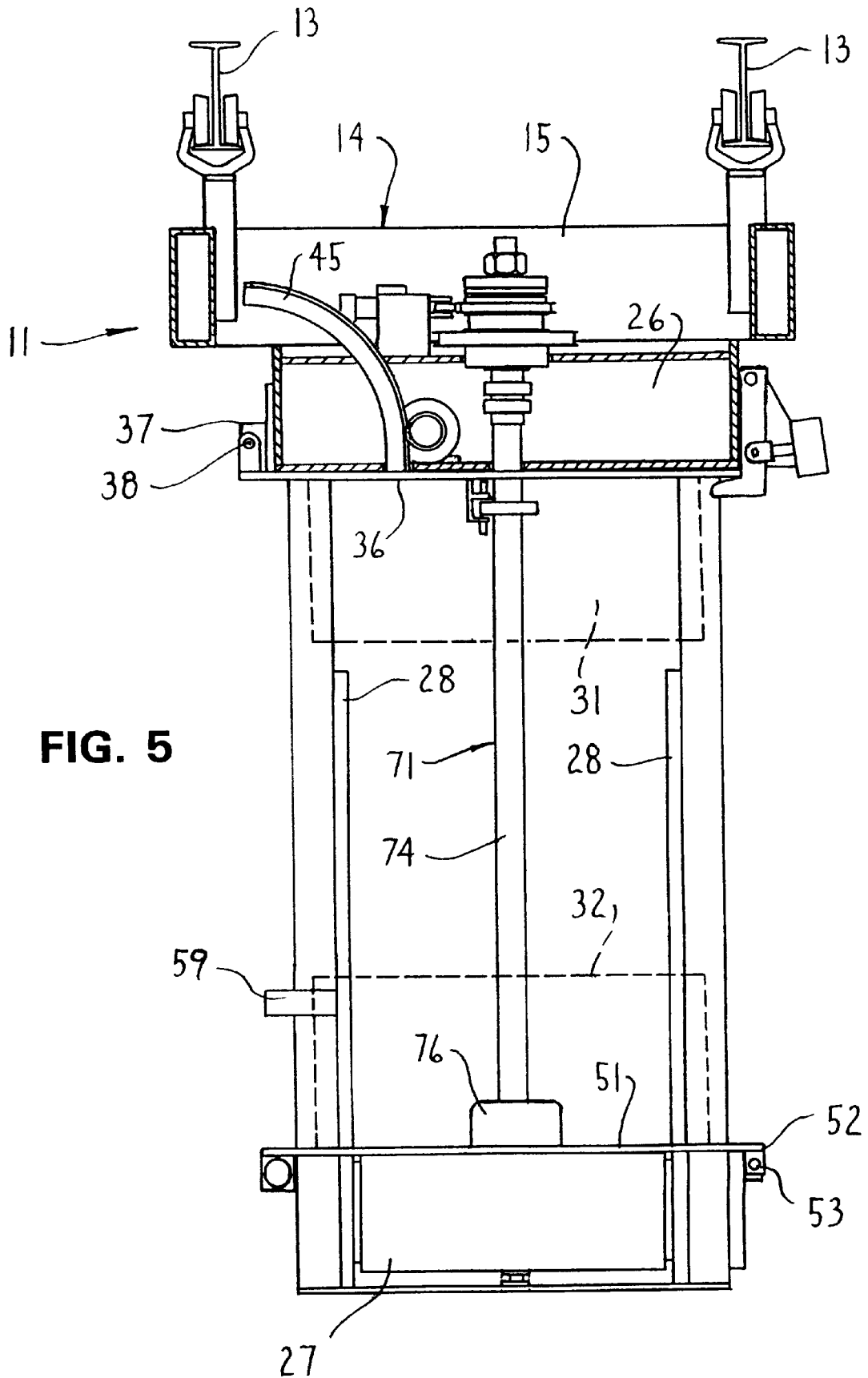
FIG. 5 is a diagrammatical end elevational view of the press unit of FIG. 4.
Figure 6:
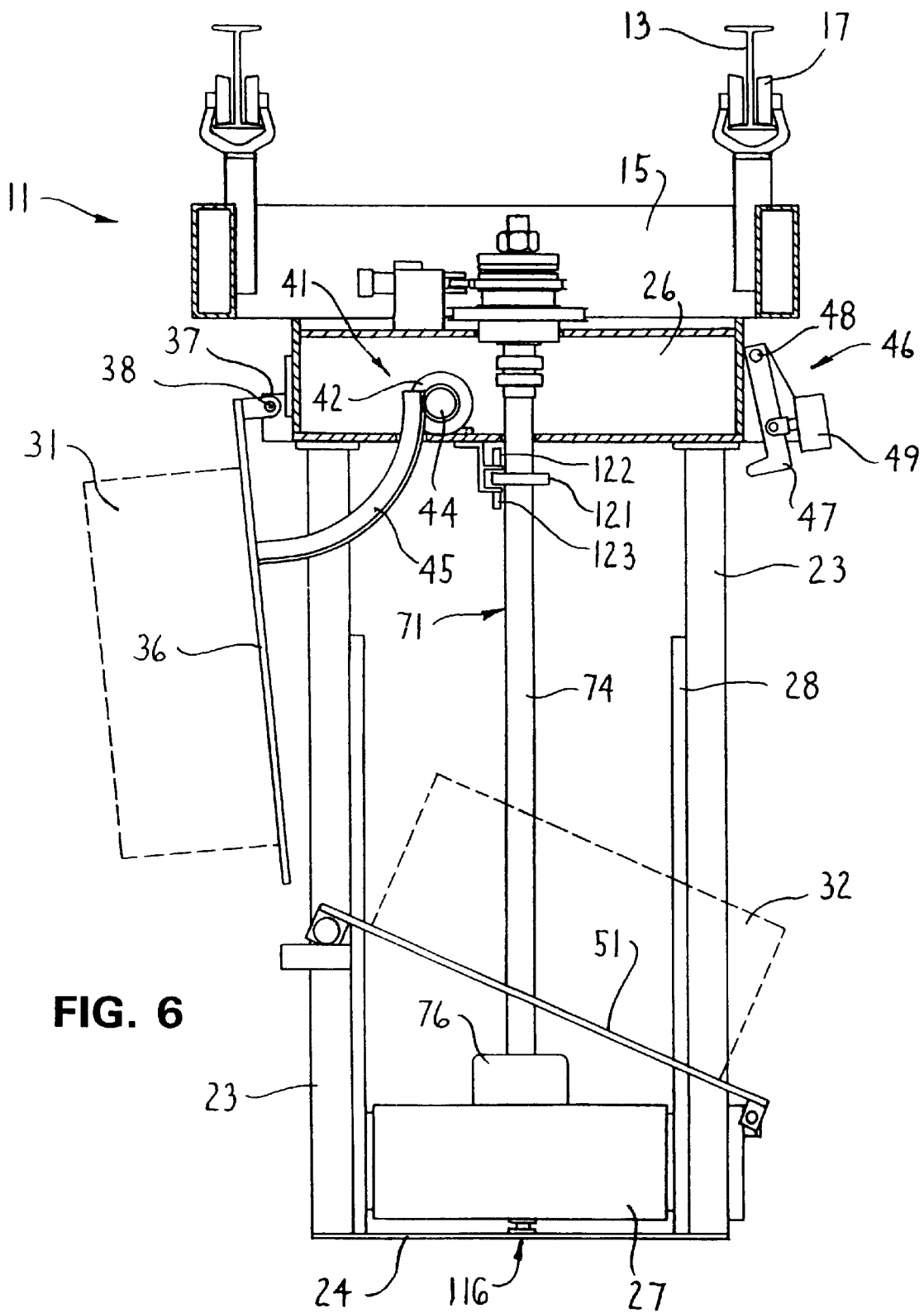
FIG. 6 is an end view similar to FIG. 5.

To effect movement of the top booking plate 36 between the upper and generally horizontal molding position shown in FIG. 5, and the vertically suspended access position shown in FIG. 6, a drive arrangement 41 is provided for effecting movement of the top booking plate 36 between the molding and access positions shown in FIGS. 5 and 6. The drive 41 includes a drive motor 42, preferably a pair of electric motors, mounted on the top frame structure 15. The motors 42 in turn rotatably drive a common drive shaft 43 which in turn has drive pinions 44 secured thereto, the latter being disposed in driving engagement with gear sectors 45. The gear sectors 45 extend through an angle of approximately 90°, and are fixedly secured to and project upwardly from the top booking plate 36. Energization of the motors 42, which are preferably reversible electric drive motors, causes driving of the gear sectors 45 to thus permit controlled swinging movement of the top booking plate 36 between the molding and access positions. The pair of drive motors 42 are preferably provided and drivingly connected to the single drive shaft 43, and the motors 42 are also each preferably provided with brake devices integrated thereon which engage whenever the motors are de-energized. The provision of the pair of motors 42 for driving a single shaft thus provide redundancy for safety purposes to accordingly provide for control over the movement and positioning of the top booking plate.

The upper press structure 26 also includes a pair of latching units 46 for positively holding the top booking plate 36 in its molding position. The pair of latch members 46 are provided on the upper press structure 26 adjacent the longitudinally extending side thereof which is opposite from the hinge axis 38, whereby the latch units 46 are positioned for cooperation with the free longitudinal extending side edge of the top booking plate 36. The latching units each include a generally L-shaped latch member 47 which is supported on the top frame structure for generally vertical swinging movement about a substantially horizontal hinge 48. An actuator 49 such as a small double-acting pneumatic cylinder has the piston rod thereof connected to the latch member 47 for effecting swinging movement thereof between an engaged position wherein the lower transversely projecting free leg of the latch member 47 projects under the free edge of the top booking plate 36, and a sidewardly retracted position wherein the latch member is disengaged from the free edge of the booking plate so that the latter can be swung downwardly into the access position.

The bottom press structure 27 also preferably includes a horizontal enlarged bottom press plate 51, commonly referred to as the bottom booking plate, the latter defining thereon a horizontally enlarged upper surface on which the bottom mold part 32 is positioned. This bottom booking plate 51 is also normally maintained in a substantially horizontal orientation so as to maintain the lower mold part 32 in upwardly facing and vertically aligned relation with respect to the upper mold part 31, this being the normal molding position for the bottom booking plate.

This bottom booking plate 51, however, is also preferably swingably mounted so as to be vertically hinged upwardly into an inclined position, substantially as illustrated in FIG. 6, to permit worker access to the mold cavity defined in the lower mold part 32. For this purpose, the bottom booking plate 51 is connected along one longitudinally extending side edge thereof to the bottom press structure 27 by a hinge structure 52, the latter defining a generally horizontally extending hinge axis 53 which extends longitudinally of the carrier along one side thereof. This hinge axis 53 extends generally in parallel relationship to the hinge axis 38, but is disposed on the opposite side of the carrier from the axis 38. This axis 53 thus permits the bottom booking plate 51 to be moved from the lowered horizontal molding position illustrated in FIG. 5, to the upwardly inclined access position illustrated in FIG. 6.

To permit movement of the bottom booking plate 51 into the inclined access position, the bottom booking plate 51 is provided with a pair of activating units 55 mounted thereon adjacent the free longitudinally extending edge thereof, that is, the longitudinal edge of the booking plate which is disposed on the side of the carrier opposite the hinge structure 52. The activating units 55 are disposed such that one such unit is disposed adjacent each end of the longitudinal free edge, so that one is positioned adjacent the end frame 21 and another is positioned adjacent the end frame 22.

Each activating unit 55 includes a roller 56 mounted adjacent the outer end of a generally horizontally elongate shaft 57, the latter being axially slidably supported on the bottom booking plate 51 for limited horizontal slidable movement in the longitudinal direction. The shaft 57 in turn is connected to and is linearly activated by a conventional linear actuator 58. The roller 56 associated with each activating unit 55 is adapted to cooperate with a transverse and horizontally elongate cam or stop 59 which is fixed to an inner surface of the adjacent support post 23. The cam 59 is fixed to the post 23 at a position wherein it is normally spaced upwardly a significant vertical distance from the normal lowermost position of the bottom press structure 27.

To activate the bottom booking plate 51 into the inclined access position, the activating units 51 are normally maintained in their deactivated positions, in which positions the rollers 56 are retracted inwardly. With the bottom press arrangement 27 in the lowermost position, the bottom press structure 27 in then moved upwardly (as described hereinafter) until the rollers 56 move upwardly past the cams 59 and are disposed at least slightly above the upper surface of the cams 59. The upward movement of the bottom press structure 27 is then stopped, and the actuators 58 of activating units 55 are energized so that shafts 57 are horizontally extended outwardly so that rollers 56 are projected into a position whereby they are disposed directly over the cams 59. The bottom press structure 27 is then again activated and is now vertically moved downwardly back to its original lowered position. During this lowering of the bottom press structure, the rollers 57 engage the fixed cams 59 so that the free edge of the bottom booking plate 51 is prevented from moving downwardly. Thus, the downward movement of the lower press structure 27 accordingly causes the bottom booking plate 51 to be vertically inclined upwardly about the axis 53, as the latter axis is being vertically lowered, whereby the bottom booking plate thus moves into the upwardly inclined position substantially as illustrated in FIG. 6. In this upwardly inclined position, in which position the bottom booking plate 51 is normally vertically inclined upwardly at an angle of between at least about 20° to about 450°, the bottom mold part 32 is inclined sidewardly toward one side of the press, and hence is thus readily accessible by a worker standing adjacent that side of the press so as to facilitate access to the mold cavity associated with the lower mold part 32. It should be noted that the lower mold part 32, when in the access position, is accessible from the side of the press which is opposite the access position of the upper mold part 31.

To provide for opening and closing of the press, and holding of the mold parts 31–32 in a closed position during the actual molding operation, the press of this invention includes a pair of substantially identical screw-type drive units 71, preferably ball-screw drive units, with one of the screw drive units 71 being associated with each of the end frames 21 and 22. These screw drive units 71 are disposed adjacent opposite longitudinal ends of the carrier, with these screw drive units being disposed in generally parallel and vertically extending relation so that each drivingly connects between the upper and lower press platens.

The screw drive units are drivingly controlled by a high speed drive 72 which in the illustrated arrangement is associated with the upper press structure 26 or top frame 15, and a low speed drive 73 which in the illustrated embodiment is provided on the lower press structure 27.

The ball screw drive unit 71 includes a generally vertically elongate drive shaft 74 which is rotatable about a generally longitudinally extending vertical axis 75. This drive shaft 74 cooperates with a ball-nut screw drive unit 76 which is mounted on the lower press structure 27, with this ball-nut screw drive unit 76 and the associated drive shaft 74 being disposed generally between the pair of support posts 23 associated with the respective end frame 21 and 22. The ball-nut screw drive unit 76 includes a rotatable nut 77 which surrounds the screw portion 79 of the drive shaft 74, and a plurality of balls 78 cooperate between the nut 77 and screw shaft portion 79, with the balls being recircular through the nut in response to relative rotation between the nut 77 and screw portion 79 in a conventional manner. The nut 77 in turn is rotatably supported within a housing 81 which is fixedly secured to the bottom press structure 27. The general construction and operation of the ball-screw arrangement is conventional, and further detail description thereof is believed unnecessary.

To effect low speed linear driving of the lower press structure 27, the low speed drive 73 includes at least one drive motor 83, preferably an electric drive motor, which is mounted on the bottom press structure 27 and which drives a drive shaft 85 through a suitable drive train 84, such as a planetary gear train. The latter shaft 85 is rotatably supported on and extends longitudinally along the bottom press structure 27, and is provided with drive worms 86 fixed thereto adjacent opposite ends thereof. Each drive worm 86 is in turn drivingly engaged with a worm gear 82 as associated with the respective ball-nut screw drive unit 76, with the worm gear 82 in the preferred and illustrated embodiment being coaxially and nonrotatably secured to the drive nut 77.

When the drive motor 83 of the low speed drive 73 is energized, this in turn causes rotation of the worms 86 which due to their engagement with the worm gears 82 effect low-speed rotation of the drive nuts 77. When the drive motor 83 is deenergized, however, then the engagement of the nonrotating worm 86 with the worm gear 82 thus effectively creates a brake or lock to prevent rotation of the drive nut 77.

Figure 7:
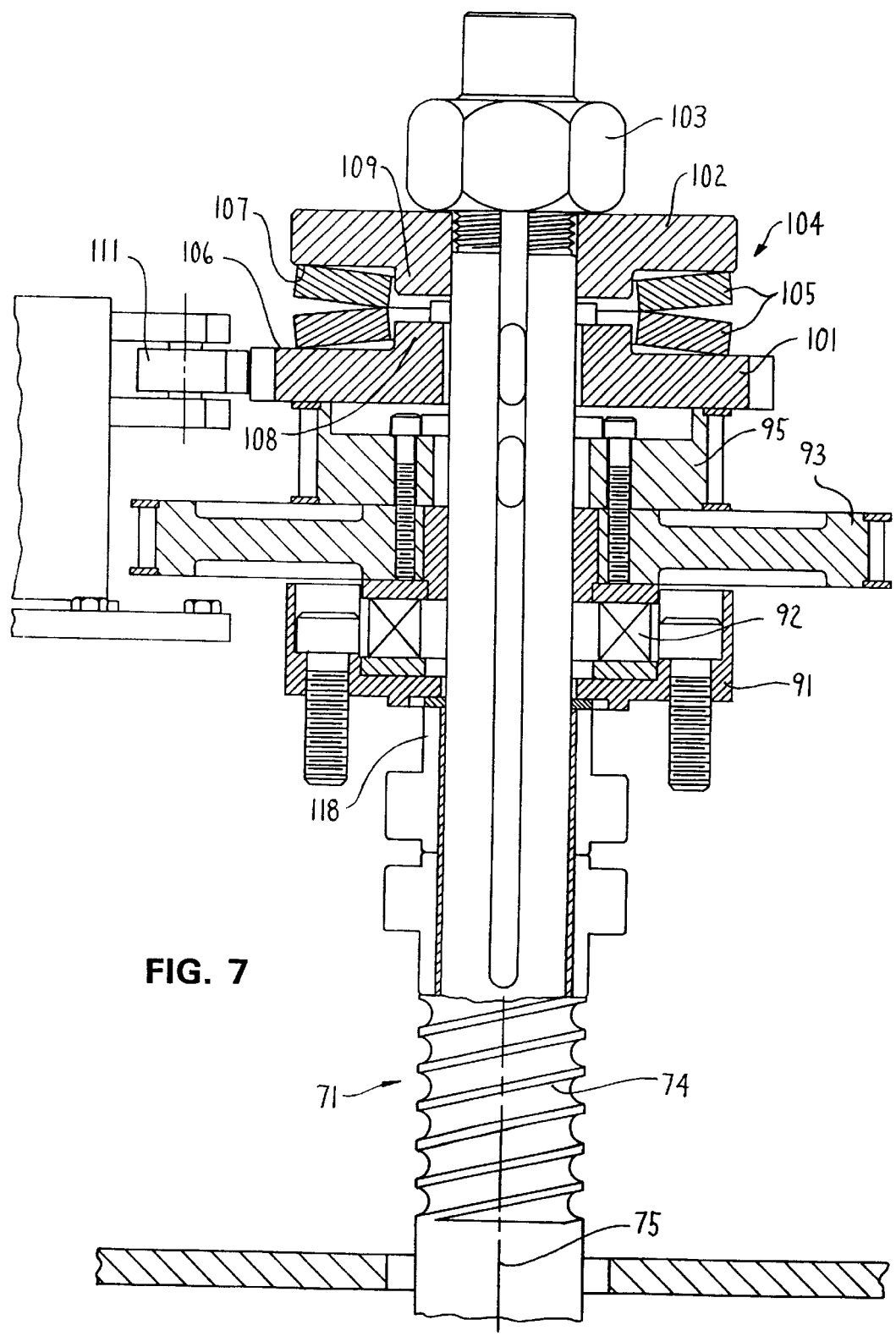
FIG. 7 is an enlarged fragmentary view, partially in cross section, of the upper portion of the screw-type drive as associated with each end of the press unit.

The upper end of the elongate drive shaft 74 associated with each screw drive unit 71 projects upwardly into and is rotatably supported on the upper frame structure. As illustrated by FIG. 7, the upper frame structure mounts thereon a bushing 91 through which the upper end of the drive shaft 74 projects. A conventional anti-friction thrust bearing 92 is engaged on the bushing 91, and a drive sprocket 93 is supported on the thrust bearing 92, with the drive sprocket 93 being coaxial with and nonrotatably coupled to the drive shaft 74, as by means of an axially extending key which permits at least limited relative axial movement between the drive shaft 74 and the drive sprocket 93. An endless drive belt 94 extends between and is engaged with the drive sprockets 93 associated with the drive shafts of the two screw drive units 71 so as to effect synchronous rotation of the drive shafts 74 associated with opposite longitudinal ends of the press. At least one further drive sprocket 95 is disposed directly above and is coaxially fixed to the respective drive sprocket 93. The drive sprocket 95 in turn is engaged with a drive belt 96, the latter being engaged with a driving sprocket 97 which is secured to the output shaft of an electric drive motor 98, the latter being mounted on the top frame structure. The motor 98 and the connections provided by the belts and sprockets as described above, thus constitute the high speed drive 72 for permitting synchronous high speed rotation of the drive shafts 74, and hence high speed raising and lowering of the bottom press structure 27.

Figure 10:
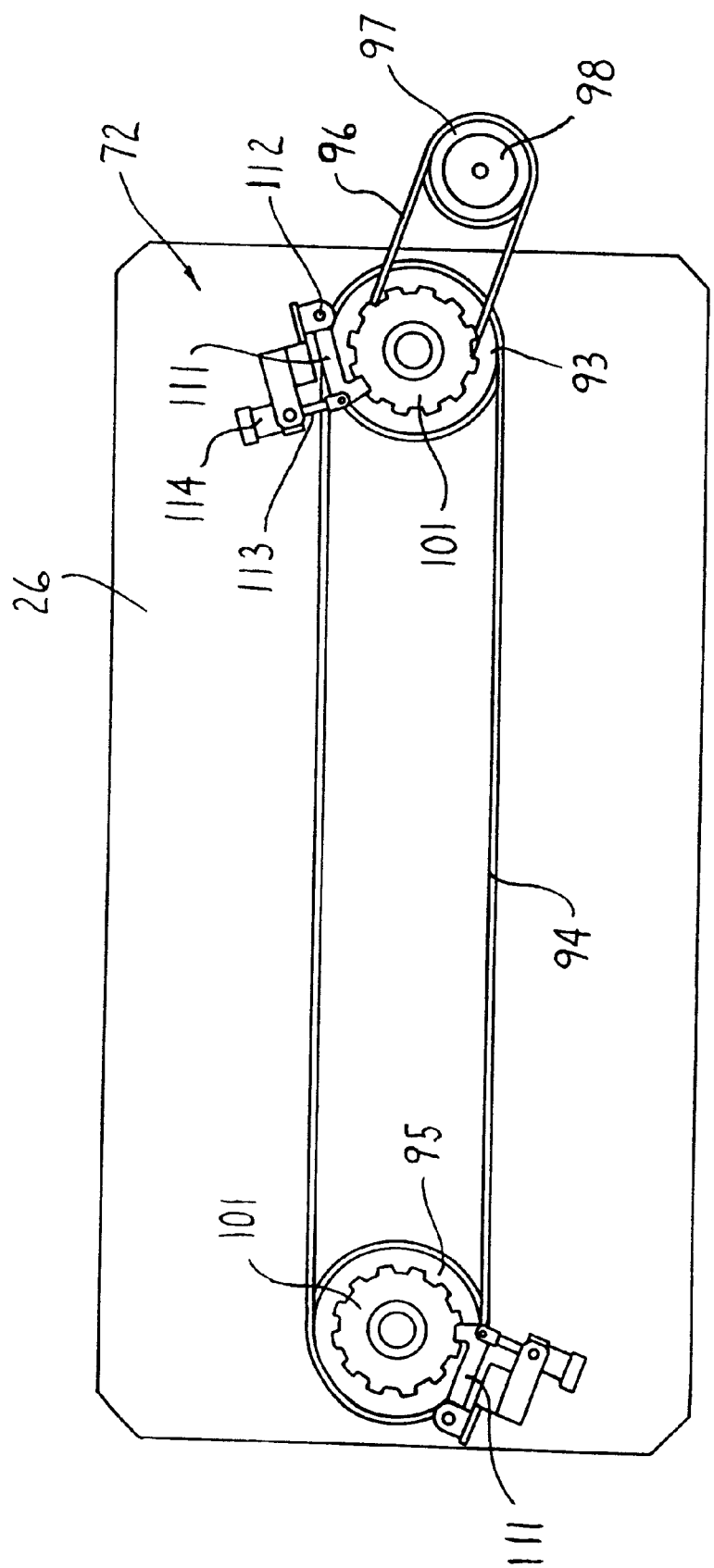
FIG. 10 is a top view of the locking devices for the drive shafts.
Figure 11:
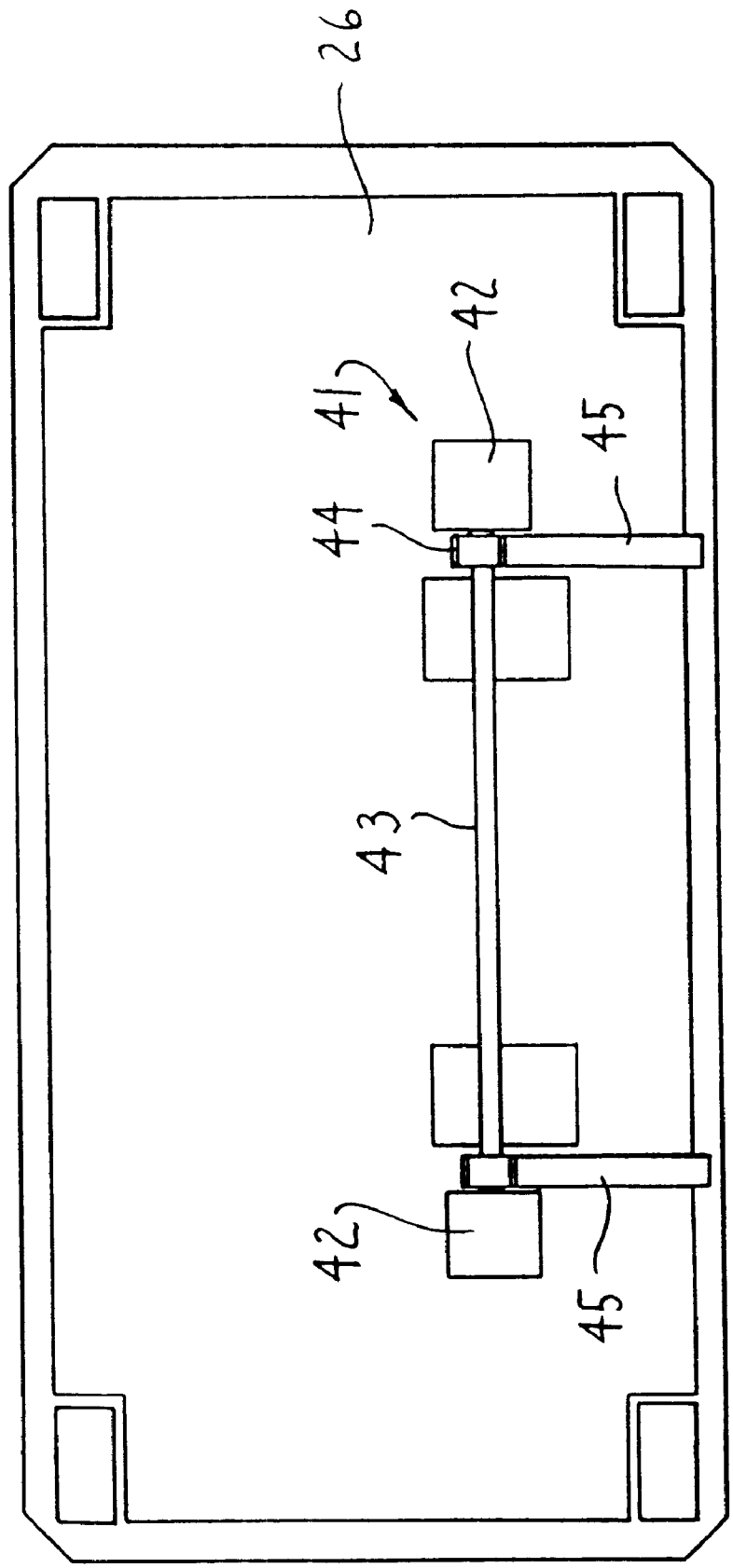
FIG. 11 is a top view illustrating the drive arrangement for controlling the tilting of the top booking plate.
Figure 12:
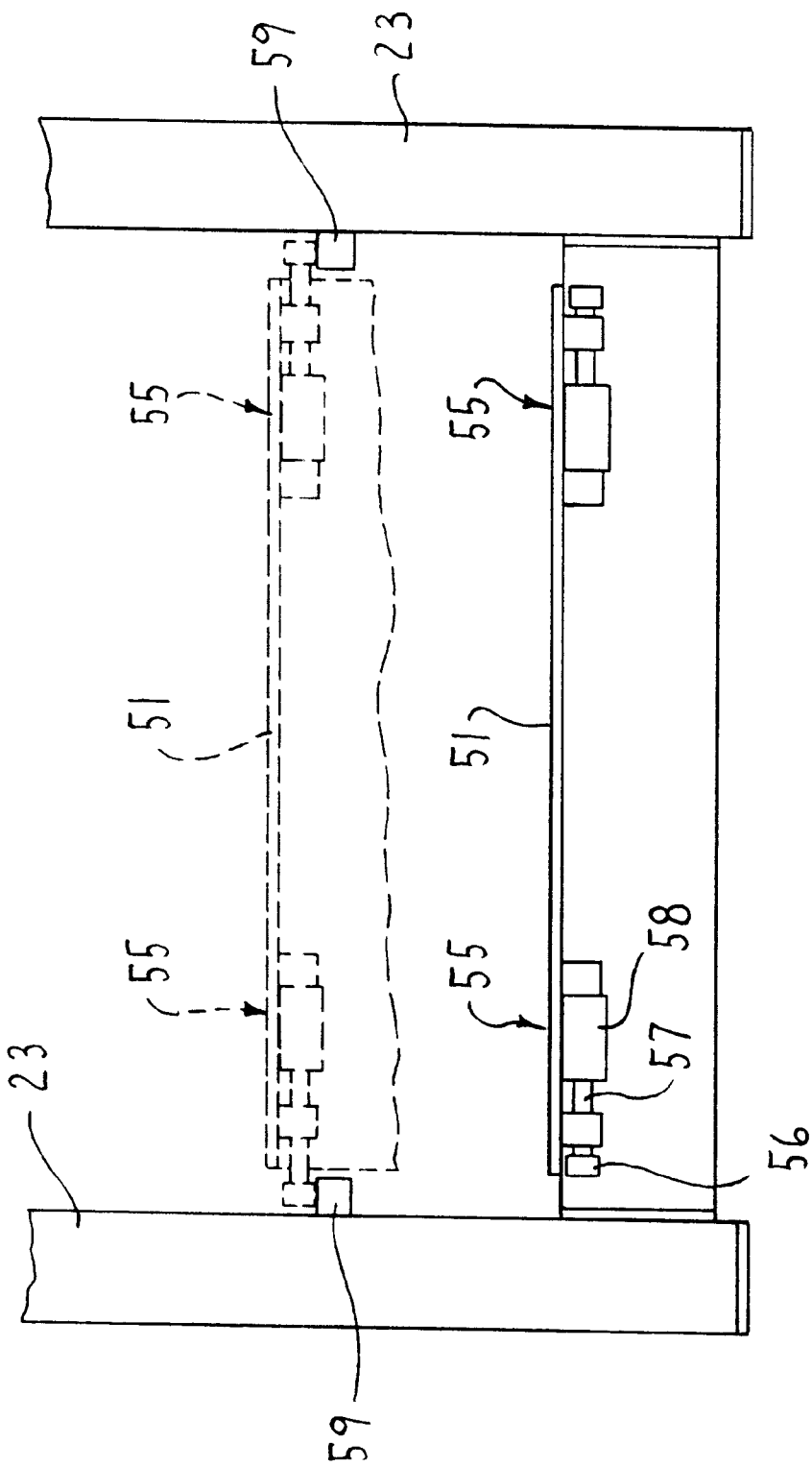
FIG. 12 is a side elevational view of the actuators for controlling tilting of the lower booking plate.

Each of the screw drive units 71 also has a locking structure associated therewith for preventing rotation of the respective drive shaft 74. This locking structure, as illustrated in FIGS. 7 and 10, includes a locking or ratchet wheel 101 which surrounds and is nonrotatably fixed to the upper end of the respective drive shaft 74, such as directly above the drive sprocket 95 in the illustrated arrangement. This locking wheel 101 has an exterior which is generally provided with one or more outwardly projecting square teeth separated by locking recesses. The locking wheel 101 coordinates with an adjacent latch 111 which is supported for horizontal swinging movement by means of a pivot 112 as provided on the top frame structure. The plunger 113 of an actuator device 114, such as a double acting pneumatic cylinder, is coupled to the latch 111 so as to permit swinging movement thereof between an inward position wherein the latch is engaged with the locking wheel 101 to prevent rotation thereof, and an outward deposition wherein the latch is disengaged from the locking wheel 101.

Each screw drive unit 71 also has a structure, specifically a resilient biasing structure 104, associated with the respective drive shaft 74 so as to permit limited axial displacement of the drive shaft 74 relative to the upper frame structure 15. This structure, for permitting limited axial displacement of the drive shaft, is illustrated in FIG. 7 and includes a pair of heavy-duty spring plates or washers 105, sometimes referred to as Bellville springs, disposed in surrounding relationship to the upper portion of the drive shaft 74. The spring washers 105 are disposed in generally opposed relation, that is, the conical configuration of the two washers are disposed so as to project in opposite axial directions. In the illustrated embodiment the lowermost spring plate 105 has the outer annular edge thereof engaged with a top annular face or surface 106 defined on the locking wheel 101, whereas the outer annular edge of the top spring plate 105 is engaged with an annular face 107 defined on the bottom side of a retainer plate 102, the latter being fixedly secured adjacent the upper end of the drive shaft by means of a retaining nut 103. The axially opposed and oppositely directed relationship of the conical spring plates 105 results in the inner annular edges of the spring plates being disposed in direct bearing engagement with one another. The locking wheel 101 and top retainer plate 102 are also provided with axially projecting annular hubs 108 and 109, respectively, the latter being disposed in opposed relationship and projecting inwardly into the center openings of the spring washers 105 so as to substantially concentrically retain the spring washers between the locking wheel and the top retainer plate. The locking wheel 101, while being nonrotatably coupled to the drive shaft 72, is also coupled in such fashion as to permit at least limited axial sliding movement therebetween, and for such purpose an axially elongate key can be utilized to provide such function.

The overall assembly of the screw drive units 71 is such that the spring plates 105 are normally maintained in a partially axially compressed condition, whereby the spring plates always exert a small upward axial biasing force on the respective drive shaft 74, thereby normally maintaining the shaft in a stationary predefined upward position, such being determined by engagement between a collar 118 provided on the drive shaft and its engagement with a downwardly facing stop flange or surface as fixedly associated with the upper press structure.

The lower end of the drive shaft 74 is preferably rotatably supported in a suitable bushing or hub which is mounted on the cross rail 24 of the respective end frame. This bushing or bearing 116 permits limited axial displacement of the drive shaft 74.

Each screw drive unit 71 also includes an axial position sensing structure which, as illustrated in FIG. 6, includes a position limit flange 121 which is fixed to and projects radially outwardly from the drive shaft 74. This position limit flange 121 is axially positioned between and is disposed in close axially adjacent relationship to top and bottom position sensor 122 and 123, respectively, the latter being stationarily but adjustably mounted relative to the top frame structure. The sensors 122 and 123 are conventional proximity switches which are capable of sensing the axial position of the drive shaft 74 relative to the top press arrangement.

The operation of the rim press 25 will now be briefly described.

Figure 4:
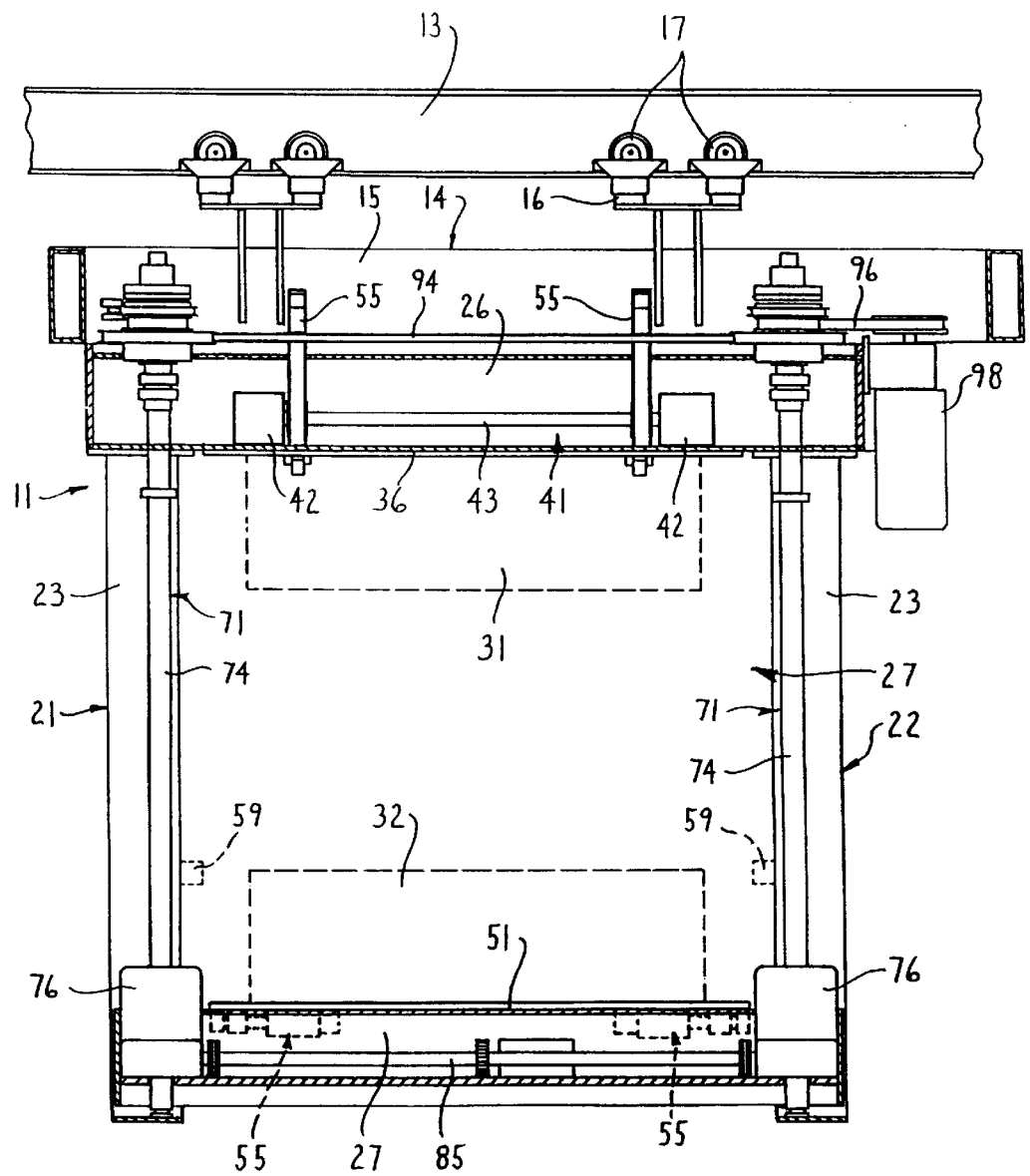
FIG. 4 is a diagrammatical side elevational view of the press unit.

The description of the operation of the press 25 will be presented on the assumption that the press is in the open position illustrated in FIG. 4. When in this position, the latch units 46 are energized so as to swing the L-shaped latch members 47 outwardly to disengage the free edge of the top booking plate 36. Thereafter the drive motors 42 are energized so that drive pinions 44 drive the gear sectors 45 downwardly, thereby causing the top booking plate 36 to swing vertically downwardly about hinge axis 38 until reaching the downwardly suspended position (FIG. 6) wherein the booking plate projects approximately vertically downwardly and is disposed adjacent one side of the carrier to facilitate worker access to the top mold part 31. When in this access position, the top mold part 31 is disposed at a more convenient elevation for access by the worker, and coupled with the sidewardly facing orientation thereof, the worker can conveniently service the upper mold part, such as by positioning the required inserts therein. In addition, if the mold has not been previously treated with a parting agent, then the mold can also have a parting agent applied thereto.

The lower mold part 32 is also moved into its access position. This is accomplished by energizing the actuator devices 114 which pivot the latches 111 out of locking engagement with the locking wheels 101. The drive motor 98 of the high speed drive 72 is then energized so that both drive shafts 74 are rotated at high speed. The rotating drive shafts react with the ball-nut screw drive unit 76 to cause the bottom press structure 27 to be vertically moved upwardly along the gibs until reaching an intermediate position wherein the rollers 56 are at an elevation just slightly above the adjacent cams 59. The high speed drive 72 is deactivated, and the actuators 58 are extended outwardly so that the rollers 56 are now positioned directly over the cams 59. The motor 98 of the high speed drive 72 is then reversely energized to drive the bottom press structure 27 downwardly to its original lowered position. During this lowering of the bottom press structure, the rollers 56 engage the upper surface of the cams 59, thereby causing the bottom booking plate 51 to be vertically swung upwardly about the hinge axis 53 as the latter is lowered. This thus causes the bottom booking plate 51 and the bottom mold part 32 mounted therein to be inclined upwardly at an angle, preferably an upwardly inclined angle of at least about 30° to about 45°, whereby the bottom mold part 32 is thus angled sidewardly of the carrier (FIG. 6) and hence is at an elevation whereby a worker positioned adjacent the side of the carrier can readily reach and access the bottom mold part without having to excessively bend or reach. Further, this bottom mold part is accessible from the side of the carrier opposite the side from which the upper mold part is accessible.

The bottom mold part is also provided with appropriate inserts, typically a fiberglass sheet and a vinyl sheet, the latter defining the exterior finished surface of the part being formed. The fiberglass and vinyl sheets are normally held within the lower mold part by vacuum provided by a vacuum pump (not shown) provided on the bottom press arrangement, such being conventional.

After the various inserts have been loaded into the mold parts, the top and bottom booking plates and the mold parts mounted thereon are then returned to their open and vertically opposed positions (FIG. 4) by a sequence of movements which is reversed to that described above. The movements of the booking plates and the mold parts mounted thereon to the access positions are preferably simultaneously carried out. However, if the size and/or configuration of the mold parts is such as to prevent synchronous movement, then the movements of the top and bottom booking plates to the access positions can be sequentially programmed.

With the mold parts returned to their opened but vertically opposed positions as indicated in FIG. 4, then in situations involving an open pour, a predetermined quantity of plastics material, typically polyurethane, is poured or injected into the mold cavity of the lower mold part. While such open pour technique is conventionally utilized, it will be appreciated that in some situations the polyurethane is injected into the mold cavity when the press is closed.

To effect closure of the press, the motor 98 of the high speed drive 72 is energized to effect high speed rotation of drive shafts 74 which in turn react with the ball-nut units to cause high speed vertical lifting of the bottom press arrangement 27. This high speed closing movement of the bottom press arrangement continues until the bottom mold part 32 is spaced a small distance, such as typically from 1 to about 5 mm, from a fully closed position with respect to the top mold part 31. At this position the high speed drive 72 is deenergized and the latches 111 are moved into locking engagement with the locking wheels 101 to nonrotatably secure the drive shafts 74. The drive motor 83 of the low speed drive 73 is then energized so that the worms 86 are rotatably driven to cause corresponding rotation of worm gears 82 and nuts 77. This rotation of nuts 77 is at a low speed and causes further upward movement of the bottom press arrangement 27 so as to effect movement of the lower mold part 32 into closing engagement with the upper mold part 31.

As the lower mold part 32 moves into engagement with the upper mold part 31, one end of the opposed mold parts 31 and 32 may contact and close prior to the other end. For example, if the rightward end in FIG. 4 fully closes prior to the leftward end, then the rightward end of the bottom press arrangement 27 can no longer move upwardly but, since the worms 86 continue to drive the worm gears 82 and nuts 77, the rotating nut 77 of the right side drive unit hence reacts with the nonrotatable drive shaft 74 and the latter is thus driven axially downwardly against the opposition of the axial biasing spring structure 104, thereby causing limited axial compression of the spring plates 105. At the same time, however, the left side continues to function in the conventional manner in that the rotation of the nut on its drive shaft 74 causes the left side of the lower press structure 27 to be slowly driven upwardly until full closure of the left side of the mold occurs.

The low speed drive continues to operate until one of the drive shafts 74 is axially moved downwardly, in opposition to the urging of the spring plates 105, until the position limit flange 121 on one drive shaft 74 moves into a position adjacent the bottom position sensor 123 so as to effect creation of a position sensing signal which then deactivates the low speed drive 73. In this latter condition, the deactivated low speed drive 73 thus creates a lock due to the worm/worm gear drive, and hence the mold is maintained locked in a closed position without requiring continual application of a driving or holding or pressing force thereto. The self locking relationship achieved between the worm and worm gear, as well as the positive locking of the drive shaft, hence ensures a secure and locked closure of the mold, and yet does not require continued energization of driving motors. Further, the springs 105 apply a controlled (but adjustable) closing force to the mold.

Upon completion of the molding operation, the press is opened generally by reversing the closing sequence. That is, the low speed drive 73 is reversely energized to apply a downward force on the lower press to effect "cracking" (i.e. initial separating) of the mold, and thereafter the low-speed drive switches off and the high-speed drive 72 switches on to permit high speed opening of the press.

With the rim press of this invention, the high linear speed of the lower platen will normally be several times greater than the low linear speed, and typically may be ten or more times greater than the low linear speed.

With the arrangement of the present invention, the overall operational sequence in terms of the basic molding steps are generally the same as utilized in conventional rim presses, namely a finished part is removed from the mold and the mold is cleaned, a release agent is then applied to the mold, inserts are thereafter loaded into the mold either manually or automatically, the polyurethane is poured into the mold either with the mold in an open or closed position, and then the mold is maintained in a closed position for a predetermined period of time so as to permit proper curing of the molded part, prior to subsequent removal thereof.

Figure 13:
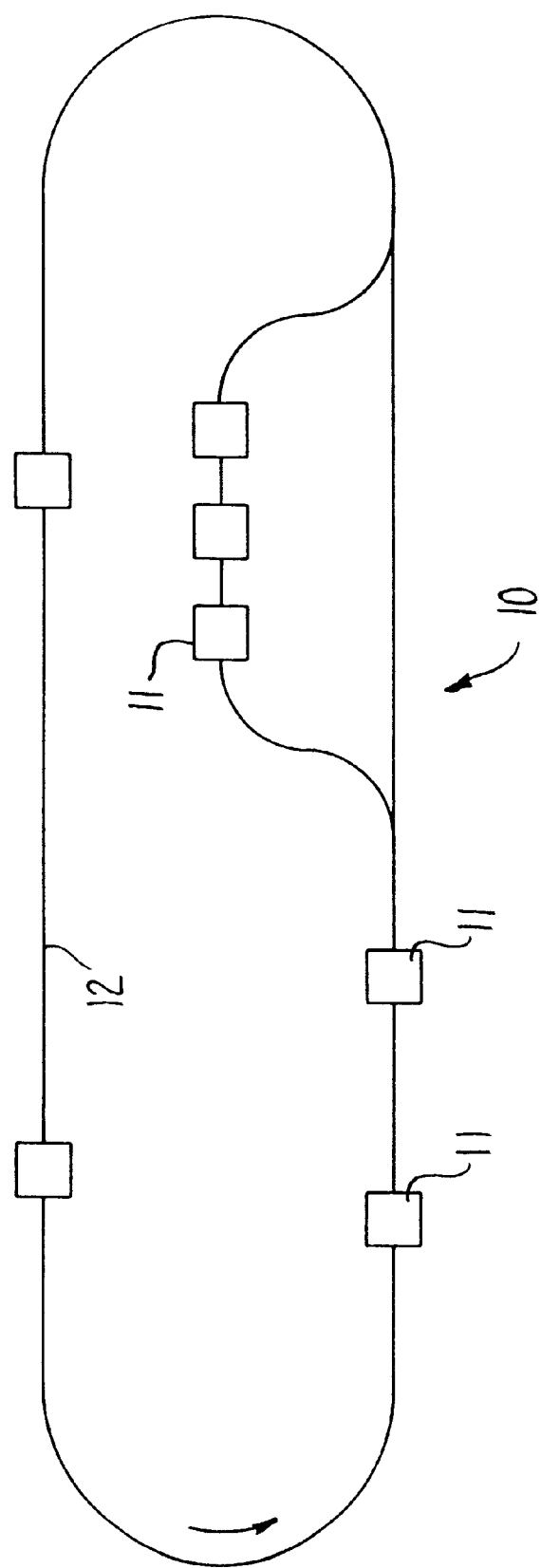
FIG. 13 is a diagrammatic top view of an overhead rail system having plural press carriers associated therewith for movement through a series of workstations.

With the improved press carrier of the present invention and specifically the provision of several such press carriers suspended from an overhead support track arrangement which defines a closed loop and which cooperates with several working stations therealong, as diagrammatically shown in FIG. 13, the press carrier can be efficiently moved from station to station so as to not only provide for more convenient and efficient utilization of workers, but also provide for overall efficiency of forming parts. For example, one station can be provided for removing the part and cleaning the tool, which station may also be used for applying the release agent, or in the alternative, the release agent may be applied at a subsequent station. The inserts are then loaded into the mold in one or two subsequent stations, either manually or automatically, depending upon the complexity of the mold and the part being formed. The urethane is then deposited in the mold. With the mold in a closed position, the mold can be moved either into a holding zone or can be slowly moved along a transfer area of the path so as to provide sufficient time for curing, following which the press carrier is recirculated back to the original work station whereby the part is removed and the mold is prepared for its next molding cycle.

Since the press has all of the key functions and specifically the movements and closure forces provided by electric motors and springs, these motors need be energized only when actual movement of the press occurs, and hence energization of the motors during the long closure and curing portion of the molding cycle is not required so that the overall energy consumption in the molding cycle is significantly reduced. The electric motor drives also provide for a significantly cleaner and safer environment, and create less disturbing noise. The axial resilient shifting as permitted in the drive screw shafts are provided adjacent opposite longitudinal ends of the mold also provide significant end-to-end compensation in that this thus permits more complete parallelism and hence more complete closure between the upper and lower mold parts, thereby compensating for irregularity in the mold faces, and providing for higher dependability of acceptable parts. This limited axial resiliency of the drive shafts also provides adequate drive train protection in that it provides compensation for the inertia of the electric motors during stoppage thereof. The spring force applied to the drive shafts by the spring plates can also be utilized as a means for measuring the mold closure force and thereby permitting proper and timely shutoff of the driving motor to ensure that a proper and controlled closure force is applied to the mold.

The self-propelled carrier carrying thereon a press, and its suspension from and driving engagement with an overhead support rail, is highly advantageous since this permits a plurality of such press carriers to be sequentially moved through a plurality of working stations while the press carriers move along a looplike closed path as defined by the rail structure, with each press carrier being independently driven. For such purpose, each press carrier as defined herein mounts thereon its own driving motors for both driving the carrier and activating the press, and additionally will mount thereon an appropriate controller (such as a PLC), the latter being controlled from a suitable central controller, such as by means of an infrared signal transferred from the primary controller to the press carrier controller. By providing a press on an independently self-propelled vehicle carrier, this also permits highly improved access to the press by workers, and particularly permits improved and simultaneous access to the press from opposite sides so that both the upper and lower mold parts can be simultaneously and efficiently serviced.

The basic overhead carrier system which is used in conjunction with the improved press carrier of this invention is itself known. One example of an overhead carrier system, known as the "Smart Track" system, is manufactured and sold by the assignee hereof.

Reference will now be made to FIGS. 14–17 which illustrate modifications of the driving arrangement, including modifications of the screw shaft drive units, which can be and are desirably incorporated into the press of FIGS. 1–12.

Figure 14:
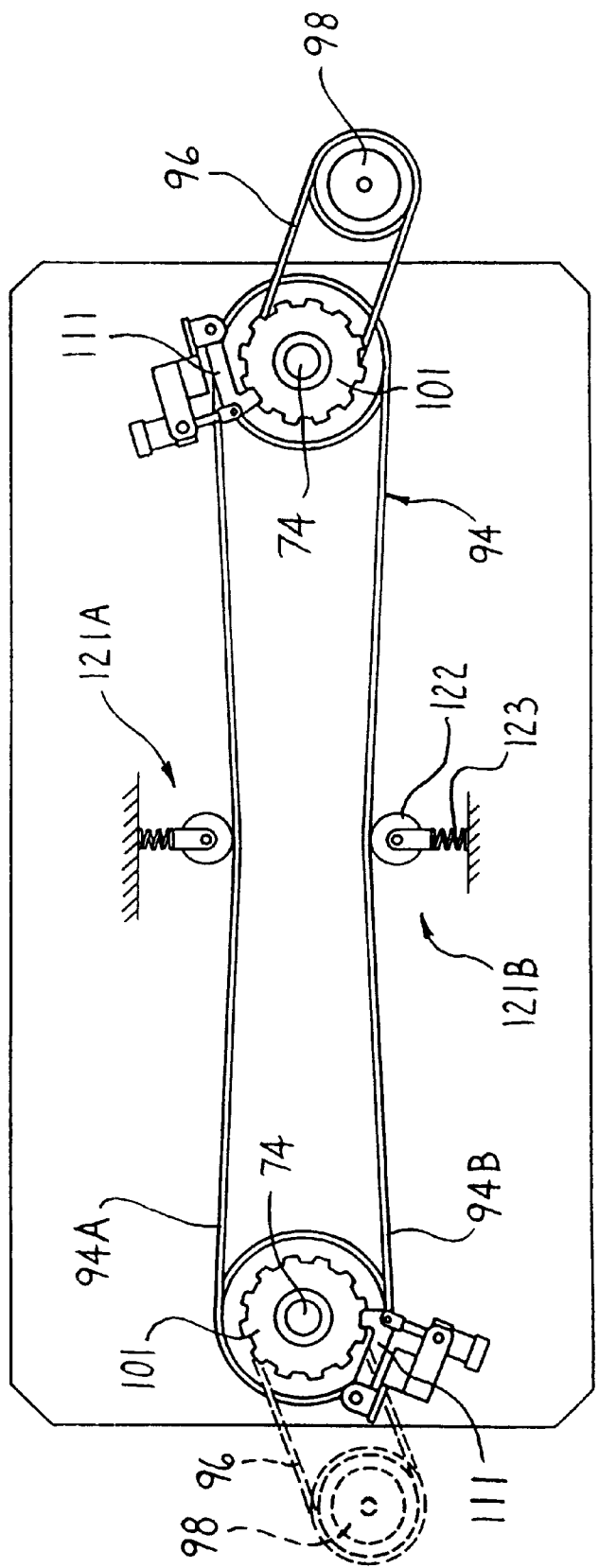
FIG. 14 is a top view similar to FIG. 10 but illustrating a modification of the high-speed drive arrangement for driving the screw shafts.

Referencing first FIG. 14, which illustrates a modification of the high-speed drive arrangement of FIG. 10, the elongate belt reaches 94A and 94B of the endless belt 94 (the latter preferably being a tooth timing belt) which couples the drive sprockets 93 and 95 are each provided with a respective tensioning or takeup device 121A, 121B associated therewith. The respective tensioning device 121A, 121B each includes an idler roller or pulley 122 urged by a spring 123 into contacting engagement with the respective belt reach 94A, 94B substantially midway along the length thereof so as to maintain proper tension in the belt reach and to ensure appropriate relative rotation between the two latch wheels 101 to ensure that both properly latch to nonrotatably hold the respective drive shafts 74.

Due to general manufacturing and assembly tolerances and required clearances between cooperating parts, the latch 111 associated with one screw shaft 74 may lockingly engage its respective latch wheel 101 prior to proper latching engagement between the latch and latch wheel associated with the other drive shaft 74. Any tendency for relative rotation between the two drive shafts 74 may cause breakage of the drive belt 94. Such breakage is eliminated or at least greatly minimized by providing each of the belt reaches 94A, 94B with its own respective tensioning and takeup device 121A, 121B. When one of the latch wheels 101 is lockingly engaged, the other latch wheel 101 can still undergo limited relative rotation as permitted by the permissible movement of the belt reaches 94A, 94B and the associated takeup devices 121A, 121B so as to permit the other latch wheel 101 to also properly latchingly engage. This thus ensures that both drive shafts 74 are properly stationarily latched into position, and the tensioning and movement provided by the takeup devices 121A, 121B permits such to occur without effecting breaking of the drive belt 94. By providing the takeup device 121A, 121B associated with each of the belt reaches, this greatly facilitates limited relative movement between the pair of latch wheels 101 irrespective of which one is initially latched, and irrespective of the direction of rotative movement.

In addition, as indicated by dotted lines in FIG. 14, each of the drive shafts 74 can be driven directly from its own respective electric drive motor 98, with the intermediate belt 94 which connects the two drive shafts together being provided for rotational synchronization therebetween. This connecting belt 94 also provides safety and redundancy in the event of a failure of one of the electric motors 95.

As is conventional, each of the electric motors 98 has a brake integrally associated therewith for stationarily holding the motor output shaft when the respective motor is de-energized.

Figure 8:
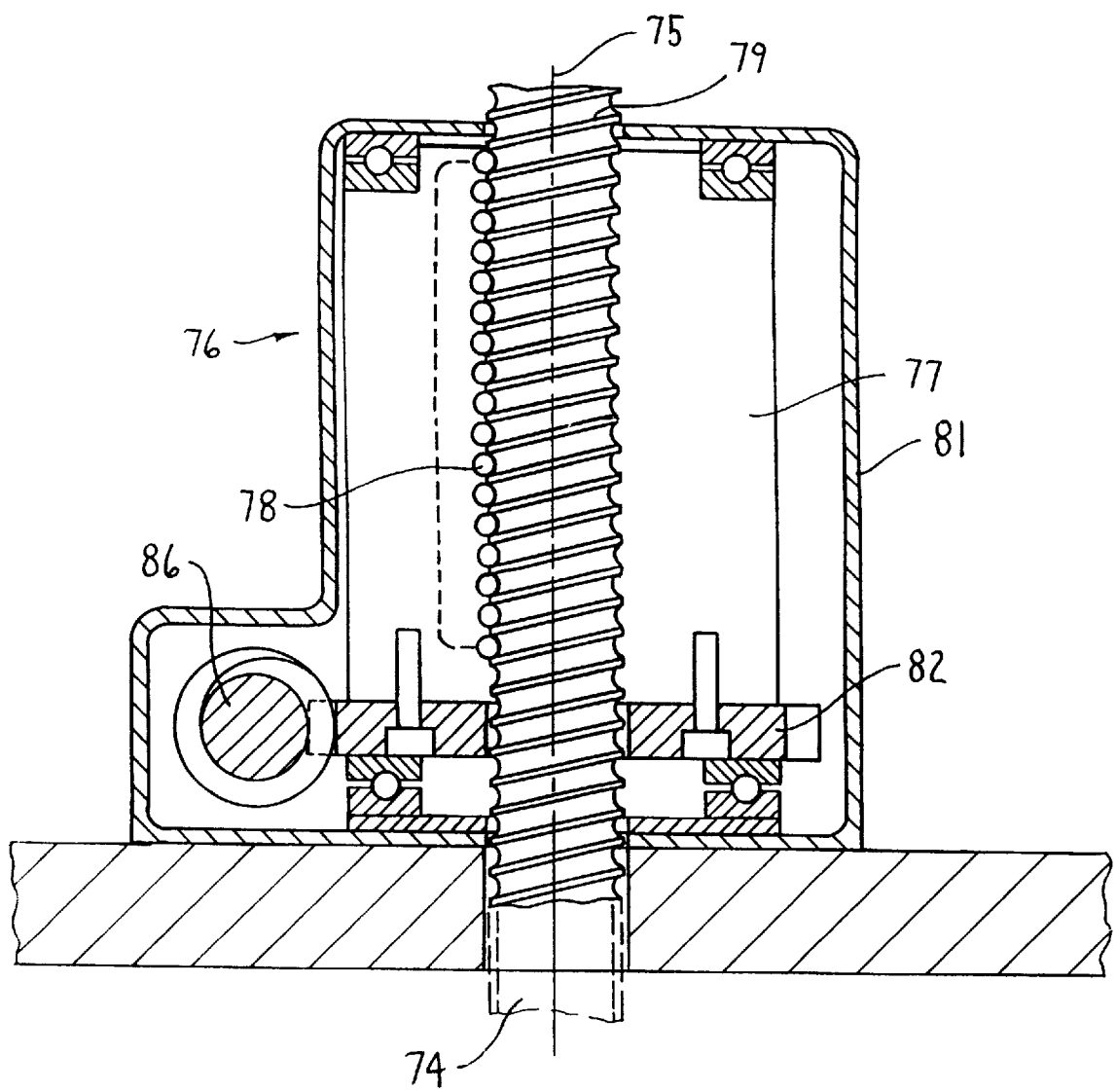
FIG. 8 is a diagrammatic sectional view showing the drive arrangement associated with the bottom platen of the press unit.
Figure 9:
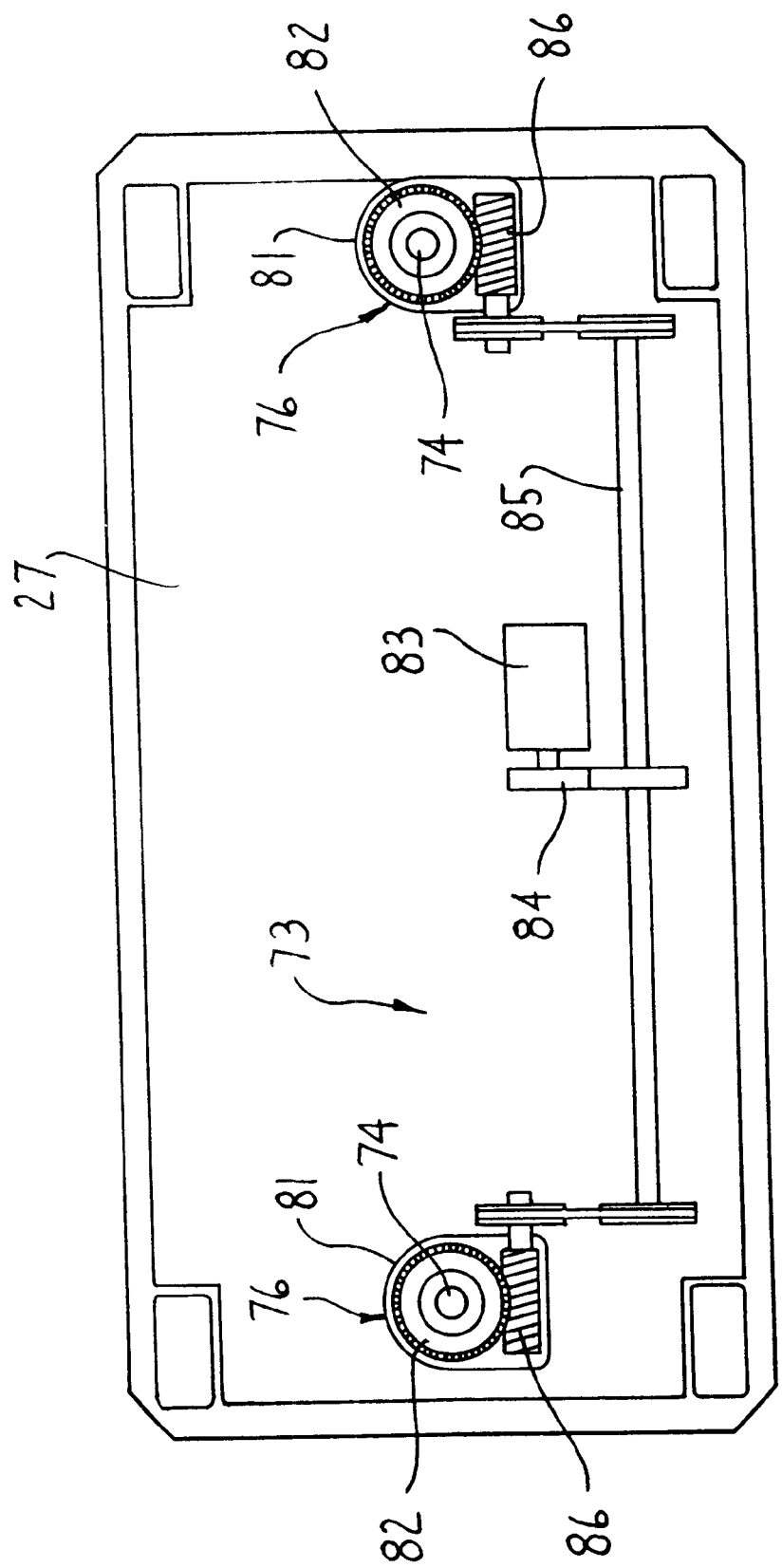
FIG. 9 is a diagrammatical top view of the low speed drive.
Figure 15:
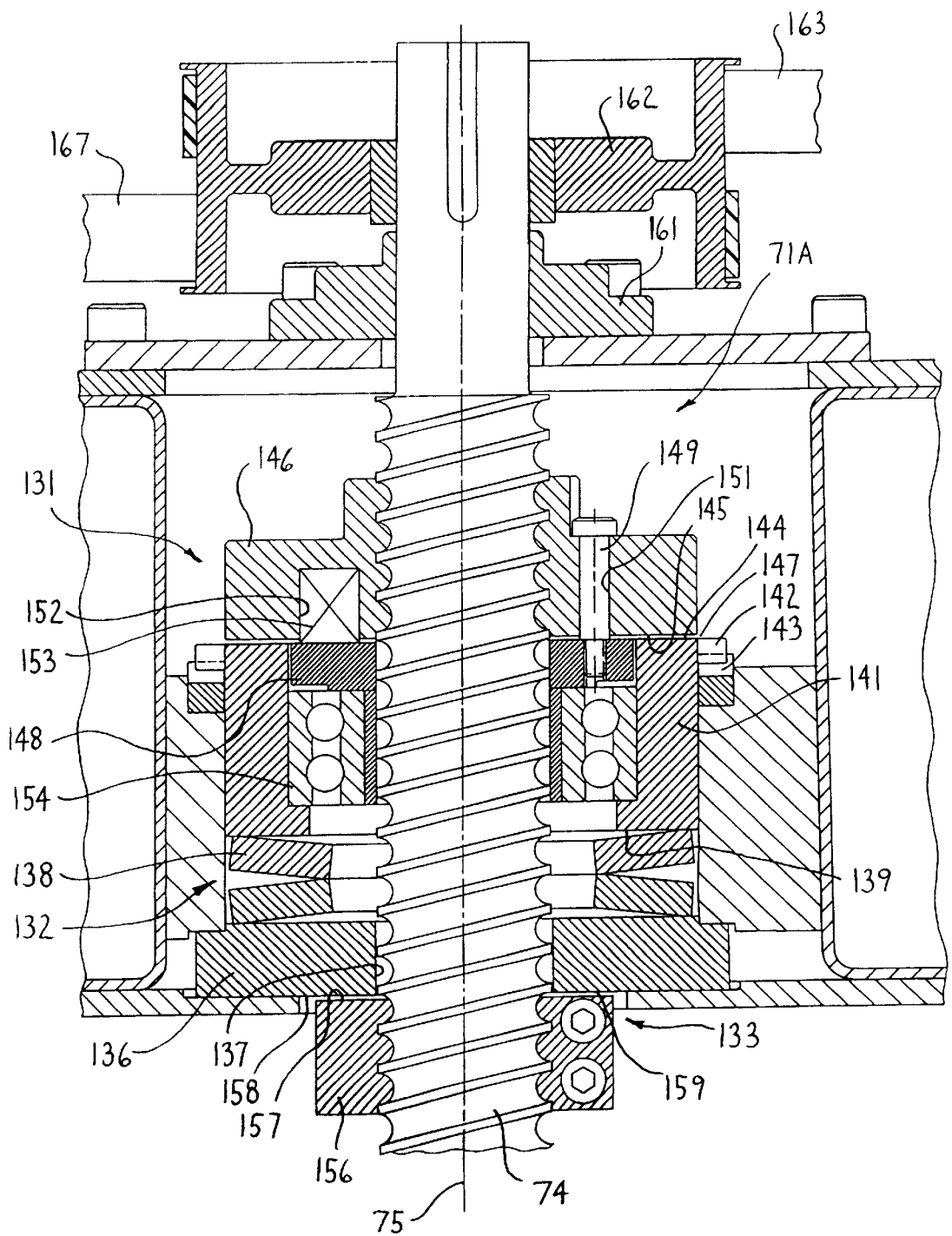
FIG. 15 is an enlarged fragmentary elevational view, partially in cross section, of an upper portion of a modified screw shaft drive as associated with the press unit.

Referring now to FIG. 15, there is illustrated the upper portion of a modified ball-screw drive unit 71A which can be used in place of the upper portion of the drive unit 71 illustrated in FIG. 7. This modified drive unit 71A includes the vertically elongate drive shaft 74 rotatable about its vertically extending axis 75 and including a screw shaft portion 79 positioned for cooperation with a ball nut rotatably provided on the lower press structure, the latter being generally the same as illustrated in FIG. 8. This modified drive unit 71A, however, includes a first brake arrangement 131 cooperating with the screw shaft 74 to nonrotatably hold the latter during final closure of the mold, and a second brake arrangement 133 cooperating with the screw shaft 74 for nonrotatably holding the latter during initial opening of the mold. A resilient biasing structure 132, which in this variation is disposed axially between the brake arrangements 131 and 133, permits limited axial displacement of the respective drive shaft 74 relative to the upper frame structure 15. With the arrangement of FIG. 15 as described in greater detail, the resilient biasing structure 104 of FIG. 7 is replaced by the resilient biasing structure 132 of FIG. 15, and the positive position-sensitive latching structures (i.e., locking wheels 101 and latches 111) as associated with each of the drive shafts 74 (FIG. 10) are eliminated and the locking or holding of the individual shafts 74 is accomplished by the cooperation of the brakes 131 and 133. Since the latter are friction brakes, they are engageable at any rotational position, whereby the position sensitivity associated with latch-type locking wheels is thus eliminated.

The arrangement illustrated by FIG. 15 includes a horizontally extending frame plate 136 which is fixedly but removably secured to the top frame structure 15, as by means of bolts (not shown), and this frame plate has an opening 137 extending vertically thereof for loosely accommodating the projection of the respective screw shaft 74 axially therethrough. The frame plate 136 supports thereon the resilient biasing device 132 which, in the illustrated embodiment, is defined by a pair of heavy-duty spring plates or washers 138, sometimes referred to Bellville springs. The spring plates 138 generally correspond to the previously described springs 105 and are disposed in inverted stack relationship so as to resiliently coact between the upper surface of the frame plate 136 and the undersurface 139 of a sleeve or brake member 141.

The brake member 141, which is part of the brake arrangement 131, is disposed in surrounding relation to the shaft 74 but is nonrotatably secured relative to the surrounding top frame structure 15. For this purpose the brake member 141 has keys or lugs 142 projecting radially therefrom and engaged within grooves or slots 143 formed in the adjacent frame structure. The fit of the keys 142 within the slots 143 is such as to prevent rotation of the brake member 141, while at the same time permitting at least limited linear displacement of the brake member 141 relative to the stationary frame structure in a direction generally parallel with the shaft axis 75.

The brake member 141 defines, on the upper end thereof, an annular upwardly-facing brake surface 144 which is disposed in opposed relationship to an annular downwardly facing brake surface 145 defined on a collar or brake member 146. The collar 146 is threaded onto but axially fixed to the shaft 74, as by a transverse pin (not shown) so that the collar 146 is thus secured for rotation with the shaft 74. The collar 146 is positioned axially adjacent the shaft so that the braking surfaces 144–145 are disposed in axially adjacent and opposed relationship, with a small axial clearance 147 normally being maintained between the opposed faces 144–145.

The collar 146 is axially coupled to a bearing support sleeve 148 which is concentrically supported within the brake member 141 in surrounding relationship to the shaft 74. The bearing support sleeve 148 is axially joined to the collar 146 by one or more angularly spaced coupling pins 149, the latter having a lower end portion thereof threadably engaged with the top flange of the bearing support sleeve 148. This coupling pin 149 slidably projects axially upwardly through a hole or bore 151 which extends through the collar 146, with the coupling pin terminating at its upper end in an enlarged head. The length of this coupling pin and its connection between the collar 146 and bearing sleeve 148 is such as to permit the small clearance 147 to be created between the opposed brake surfaces 144–145.

This latter clearance 147 is normally maintained by biasing structure such as springs coacting axially between the bearing support sleeve and the collar. This biasing structure, in the illustrated embodiment, is formed by a plurality of recesses 152 which are formed in angularly spaced relation around the collar 146, with these recesses 152 opening axially upwardly from the bottom brake surface 145. Each recess confines a spring such as a coil-type compression spring 153 therein which reacts between the bottom of the respective recess and the opposed braking surface 144 on the bearing support sleeve 148. These springs 153 urge the collar 146 upwardly relative to the brake member 141, as limited by the engagement with the enlarged heads of the pins 149, to thus maintain the desired small clearance 147 between the brake surfaces 144–145.

The brake sleeve 141 is concentrically supported relative to the shaft 74 by means of a conventional anti-friction bearing 154, the latter having its inner race secured to the bearing support sleeve 148, and its outer race secured to the braking sleeve 141. This thus enables the shaft 74 to freely rotate relative to the brake sleeve 141, and also enables the shaft 74 and collar 146 mounted thereon to move axially with respect to the bearing support sleeve 148 and the braking sleeve 141.

As to the second brake arrangement 133, it is defined by a collar 156 which is threaded onto and nonrotatably coupled to the shaft 74 at a location axially below but closely adjacent the frame plate 136. This collar 156, at its upper end, defines thereon an annular brake surface 157 which is disposed in axially opposed relationship to an annular bottom surface 158 defined on the frame plate 136. These opposed surfaces 157 and 158, which create a friction brake arrangement, are normally maintained in closely adjacent but slightly axially spaced relation so as to create a narrow axial gap or clearance 159 therebetween.

Figure 16:
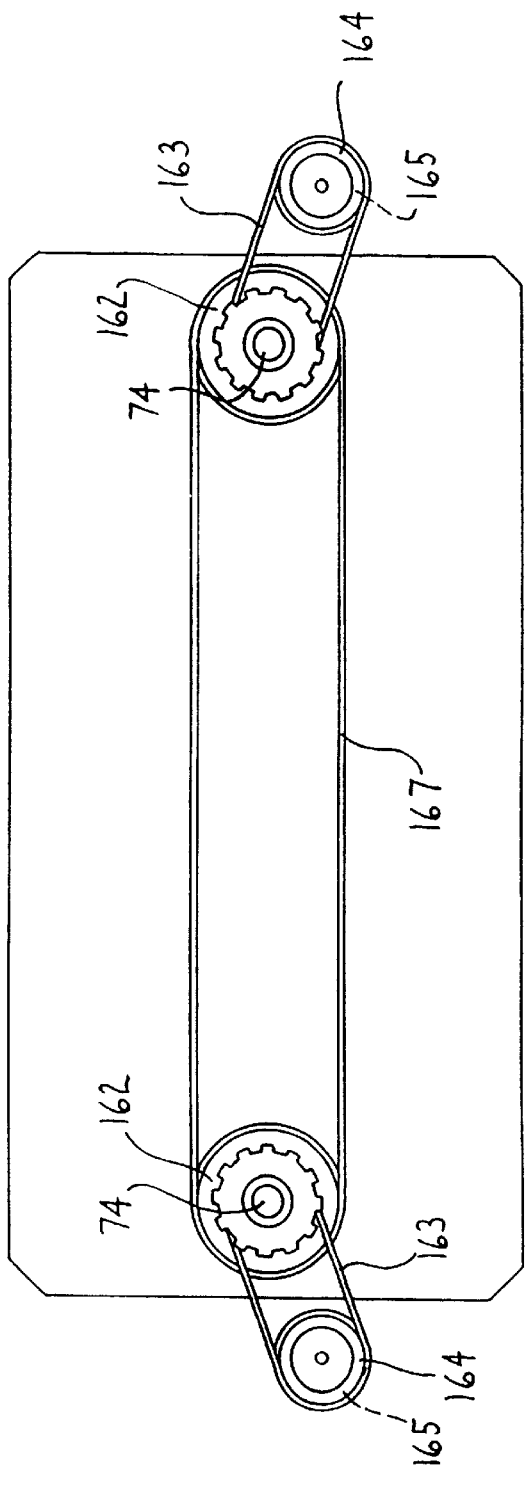
FIG. 16 is a top view similar to FIG. 13 but illustrating a further modified high-speed drive arrangement for the screw shafts.
Figure 17:
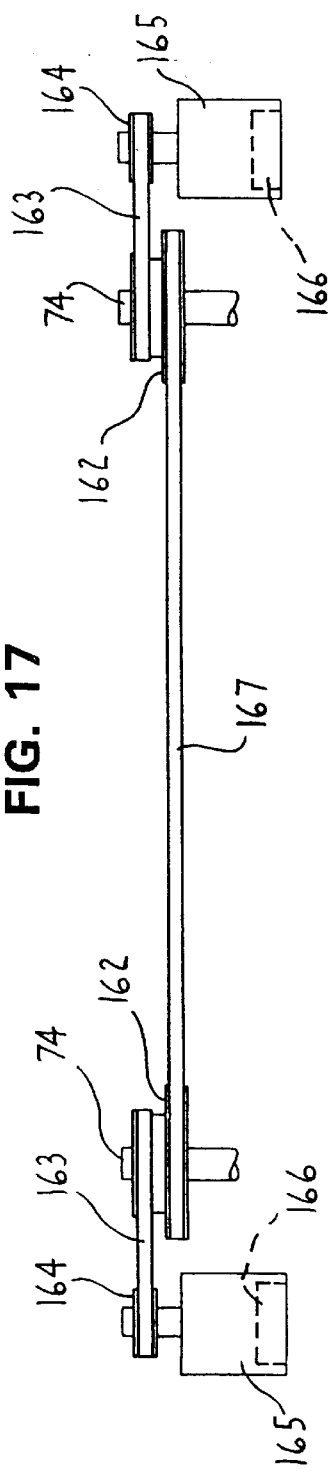
FIG. 17 is a fragmentary side view of the modified drive arrangement of FIG. 16.

When the parallel drive shafts 74 of the press are provided with friction brakes 131 and 133 associated therewith as illustrated in FIG. 15, then the shafts 74 are preferably driven from high-speed electric motors 165 as illustrated by FIGS. 16–17. That is, each drive shaft 74 has an upper portion thereof which projects upwardly through a journal plate 161 (FIG. 15) which is fixed to the frame, which journal plate rotatably and axially slidably supports the upper portion of the drive shaft. This upper drive shaft portion has a drive pulley arrangement 162 nonrotatably secured to the upper end thereof. The pulley arrangement 162 as illustrated in FIG. 15 is a complex or multiple pulley arrangement in that it has an upper pulley portion engaged with a driving belt 163, the latter being driven directly from the respectively adjacent high-speed electric drive motor 165. This complex pulley 162 also has a lower portion thereof engaged with a further endless belt 167, such as a toothed timing belt, the latter being engaged with the pulleys 162 of at least the two drive shaft 74 so as to ensure rotational synchronization therebetween, even though each drive shaft 74 is driven from its own respective high-speed electric motor. Each of the motors 165 has an internal brake 166 associated therewith for holding its respective shaft 74 stationary when the motor is in a non-driving condition.

The operation of the press, when incorporating therein the driving arrangement of FIGS. 15–17, will now be briefly described.

When the press is in the open position and both the upper high-speed and lower low-speed drives are de-energized, the drive shafts 74 are held stationary by the internal brakes 166 associated with the high-speed drive motors 165, and the friction brakes 131 and 133 are both disengaged as illustrated in FIG. 15. When the press cycle is activated, the high-speed motors 165 are energized which effects appropriate rotation of the screw shafts 74 which react with the ball nuts on the lower press to effect upward movement of the latter. During this upward movement, the lower press is moving freely upwardly so that the load on the screw shafts is minimal, and thus the screw shafts 74 remain in the normal operational position substantially as illustrated by FIG. 15 whereby both friction brakes 131 and 133 are disengaged. When the lower press has moved upwardly in the closing direction to a location closely adjacent the closed position, which can be determined by appropriate position sensors or appropriate control circuitry or software associated with the rotation of the drive screws, then the high-speed motors 165 are de-energized and the drive shafts 74 are maintained nonrotatable by the internal brakes 166 associated with the drive motors.

The drive motor 83 of the low-speed lower drive 73 (FIG. 9) is then energized to effect driving rotation of the ball-nut drive units 76 so as to effect the final upward closing movement of the lower press. The actual closure between the upper and lower mold parts increases the loading on the ball-nut drive units 76, which impose a reaction force on the screw shafts 74 causing the latter to be displaced axially downwardly. This downward displacement of the screw shaft 74 causes the collar 146 to move downwardly so that the brake surfaces 144–145 engage and thereby provide a friction brake which provides a much greater braking torque than is provided for the motor brake 166, and hence is able to hold the shaft 74 nonrotatable even though the lower drive and the reaction of the ball-nut unit 76 imposes a sufficiently greater torque on the shaft 74 so as to effect the desired closure between the upper and lower mold parts. The downward displacement of the shaft 74 and of the collar 146 carried thereon not only causes the friction brake 131 to engage, but can also cause some downward displacement of the resilient spring device 132, depending upon the torque being generated at the ball-nut drive units 76. The downward displacement of shaft 74 also causes the collar 156 to be moved downwardly so as to increase the separation or gap 159 at the brake 133.

During the final closure of the mold, if there is any longitudinal misalignment so that one end of the mold fully closes prior to the other end, then the rotating nut unit 76 associated with the closed end of the mold continues to rotate and reacts with the respective nonrotatable drive shaft 74 so that the shaft 74 and its collar 146 are driven downwardly and in turn drive the nonrotatable brake sleeve 141 downwardly so as to cause deflection of the springs 138. At the same time, the drive shaft 74 at the other side of the press continues to operate in a conventional manner until full closure of the other side of the mold occurs.

Upon reaching a full closure position, as sensed by an appropriate position or force sensing signal, the low-speed drive 73 is deactivated, and the drive units 71 including the drive shafts 74 are maintained in their previously established positions due to the reaction forces imposed on the screw shafts 74 via the respective drive nut units 76.

After the desired forming or pressing operation has been completed, then the drive motor 83 of the lower drive 73 is energized in the reverse direction to effect downward opening movement of the lower press. The initial driving torque as imposed on the ball-nut units 76 enables them to initially relatively rotate downwardly with respect to the screw shaft 74 so that the latter moves upwardly to relieve the compression of the spring unit 132 and effect disengagement of the upper brake 131, followed by the bottom brake collar 156 of the brake 133 being moved upwardly into frictional braking engagement with the bottom surface 158 of the frame plate 136. With the brake 133 engaged so as to impose a large frictional torque preventing rotation of the respective drive shaft 74 (which braking torque as generated by brake 133 is significantly greater than the brake torque generated by the internal motor brake 166), the full driving torque of the lower drive can now be imposed on the ball drive units 76 in the opening direction of the press so as to create a sufficient force to effect "cracking" between the upper and lower mold parts and thus effect initial downward separation of the lower mold part. As soon as the large-magnitude cracking force is able to effect initial separation between the upper and lower mold parts, then the weight of the lower mold and the gravity effect thereof is immediately reapplied to the lower press and is transferred by the ball-nut drive units 76 onto the shafts 74 which shifts the shafts 74 downwardly a small extent so that the brake collars 156 move downwardly so as to release the lower friction brakes 133. The axial positioning of each shaft 74 is thus reestablished substantially as illustrated in FIG. 15 wherein the upper and lower brakes are both in a released position, and the shaft is maintained nonrotatable due to engagement of the internal motor brake 166. After the initial separation between the upper and lower molds, the motor 83 of the lower drive is deenergized, and the upper high-speed drive motors 165 are energized in a reverse rotational direction so that the shafts 74 are appropriately rotated so as to effect a high-speed lowering of the lower press back to its fully open position.

With the arrangement of FIG. 15 as described above, the brake 131 is thus engaged so as to provide a high holding torque to maintain the respective shaft 74 stationary during the final closure of the mold by the lower low-speed drive, and similarly the friction brake 133 is engaged so that the lower low-speed drive can create the necessary torque to create a high "cracking" force to effect initial opening or separation of the mold following the molding cycle. In each instance, the frictional braking torque created by the brake 131 on mold closure, and the frictional braking torque created by the brake 133 on mold opening, are sufficient to withstand the high forces and torques developed during the final closure and the initial opening of the mold, and these holding torques created by brakes 131 and 133 significantly exceed the small torque capacity of the internal brake 166 associated with the high-speed drive motor 165. Since the braking torque provided by the motor brake 166 is normally not of sufficient capacity to hold the drive shafts 74 during final closure or initial opening of the mold, the additional brakes 131 and 133 are capable of doing so, and hence additional separate locking or latching structures for the drive shafts 74, such as the locking wheels 101 and latches 111, are not required. This thus eliminates the difficulty associated with synchronizing latches associated with two or more rotatable shafts, and minimizes the related structure and the controls required thereby.

Furthermore, by using a separate drive motor 165 associated with each drive shaft 74, this provides additional safety and redundancy since, if one motor 165 fails, the other motor is capable of providing torque to each drive shaft through the intermediate timing belt 167, and the brake 166 associated with the surviving motor is able to provide sufficient brake torque to prevent any undesired release or free rotation of the drive shafts 74.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A rim press for permitting molding of an element between first and second mold parts which when closed cooperate to define a mold cavity therebetween, said press comprising:

a frame;

first and second platen arrangements supported on said frame and respectively defining thereon a first press surface on which said first mold part is mounted and a second press surface disposed in opposed relation with said first press surface and on which said second mold part is mounted;

a drive arrangement drivingly interconnected to said first platen arrangement for controlling movement thereof between open and closed positions of said mold parts, said drive arrangement including a pair of drive shaft units drivingly connected to said first platen arrangement and disposed at opposite ends thereof, each said drive shaft unit including an elongate screw shaft extending between and rotatably supported relative to said first and second platen arrangements and which is rotatably engaged with a nut member which surrounds said screw shaft and is mounted on said first platen arrangement for movement therewith in response to relative rotation between said nut member and said screw shaft; and a brake arrangement associated with one end of each said screw shaft, each said brake arrangement including a first friction brake, a second friction brake cooperating between said frame and said screw shaft, and a resilient biasing structure disposed between said first and second friction brakes and exerting a spring force on said screw shaft to urge same axially in a direction of closing movement of said first platen arrangement, said first friction brake automatically engaging and holding said screw shaft nonrotatable in response to an axial load imposed on said screw shaft during final closure of the mold parts causing said screw shaft to displace axially in a direction opposite to said closing direction and in opposition to said spring force, and said second friction brake automatically engaging and holding said screw shaft nonrotatable in response to axial displacement of said screw shaft in said closing direction as effected by said resilient biasing structure during initial cracking of the mold parts.

2. A press according to claim 1 wherein said drive arrangement includes a first drive means mounted on said frame and interconnected to said screw shafts for effecting rotation thereof, said first drive means including an electric drive motor, and second drive means mounted on said first platen arrangement and drivingly interconnected to said nut members for effecting rotation thereof relative to said second platen arrangement, said second drive means including a second electric motor.

3. A press according to claim 1 wherein said first friction brake includes a first spring which normally maintains said first friction brake in a disengaged position and which exerts a force on said screw shaft in said closing direction, and said resilient biasing structure includes a second spring cooperating between said frame and the respective said screw shaft for resiliently urging said screw shaft in said closing direction to permit axial displacement of said screw shaft in the direction opposite to said closing direction and in opposition to said spring force of said second spring during final closure of the mold parts to adjust for mold irregularity, said first spring exerting an axial force on said screw shaft which is significantly smaller than the spring force of said second spring exerted on said screw shaft.

4. A press according to claim 1 wherein said first friction brake includes a first annular brake member which is fixed to said screw shaft in surrounding relation therewith, a second annular brake member which is nonrotatably fixed to said frame but is axially movable relative thereto, said first and second annular brake members defining thereon axially opposed annular friction brake surfaces, and a spring cooperating between said first and second annular brake members for normally maintaining said brake surfaces in disengaged relation.

5. A press according to claim 4 wherein said spring is a first spring and said resilient biasing structure includes a second spring axially confined between said frame and said second annular brake member for resiliently urging said second annular brake member axially toward said first annular brake member, said second spring being stronger than said first spring and permitting limited axial displacement of the respective said screw shaft relative to said frame.

6. A press according to claim 5 wherein said second friction brake includes an annular brake collar fixed to the respective said screw shaft adjacent a frame member so that said frame member is interposed axially between said brake collar and said second spring, said brake collar and said frame member having opposed annular brake surfaces thereon which are normally maintained disengaged with one another.

7. A press according to claim 1 wherein said nut members comprise ball-nut members which are mounted on and vertically restrained relative to said first platen arrangement, and said drive arrangement includes a high speed drive mechanism directly connected to said screw shafts for rotating same to effect linear displacement of said first platen arrangement at a first speed, and a low speed drive mechanism directly connected to said ball-nut members for rotating same relative to the respective said screw shafts to effect final closing movement of said first platen arrangement at a second speed which is substantially smaller than said first speed.

8. A press according to claim 7 wherein said first and second friction brakes and said resilient biasing structure each have an annular configuration and are disposed coaxially along the respective said screw shaft and in surrounding relation therewith, said first and second friction brakes each defining a pair of opposed brake surfaces which are oriented transversely relative to a longitudinal axis defined by the respective said screw shaft.

9. A press according to claim 8 wherein each said first friction brake includes a first annular brake member which is fixed to the respective said screw shaft and a second annular brake member which is nonrotatably fixed to said frame but is axially movable relative thereto, said first and second annular brake members respectively defining thereon said opposed brake surfaces of said first friction brake, and a biasing member disposed between said first and second annular brake members for normally maintaining said brake surfaces thereof in disengaged relation with one another, said second friction brakes each including an annular brake collar fixed to the respective said screw shaft adjacent an annular and fixed frame plate, said frame plate being sandwiched axially between said brake collar and said resilient biasing structure, said brake collar and said frame plate respectively defining thereon said opposed brake surfaces of said second friction brake which are normally maintained disengaged with one another.

10. A press according to claim 7 wherein said low speed drive mechanism includes an electric motor which is energized in a first direction to rotate said ball-nut members and effect final closure of the mold parts and as the mold parts are clamped together, said ball-nut members impose a reaction force on the respective said screw shafts to displace same axially downwardly and opposite to said closing direction to engage said first friction brake and compress said resilient biasing structure, said electric motor being energized in a second direction opposite to said first direction to effect opening of the mold parts and causing said ball-nut members to rotate downwardly relative to the respective said screw shafts so that same displace axially upwardly to relieve the compression of said resilient biasing structure, effect disengagement of said first friction brake and engagement of said second friction brake such that the full driving torque of said low speed drive mechanism is imposed on said ball-nut members to separate the mold parts from one another.

11. A press according to claim 10 wherein each said first friction brake includes a first annular brake member which is fixed to the respective said screw shaft and a second annular brake member which is nonrotatably fixed to said frame but is axially movable relative thereto, said first and second annular brake members each defining a pair of opposed brake surfaces, and a biasing member disposed between said first and second annular brake members for normally maintaining said brake surfaces thereof in disengaged relation with one another, said second friction brakes each including an annular brake collar fixed to the respective said screw shaft adjacent an annular and fixed frame plate, said frame plate being sandwiched axially between said brake collar and said resilient biasing structure, said brake collar and said frame plate respectively defining thereon said opposed brake surfaces of said second friction brake which are normally maintained disengaged with one another.

\* \* \* \* \*